(12) United States Patent
Chau

(10) Patent No.: US 11,002,626 B2
(45) Date of Patent: *May 11, 2021

(54) MEMS PRESSURE SENSOR AND METHOD FOR FORMING THE SAME

(71) Applicant: MEMSEN ELECTRONICS INC, Tianjin (CN)

(72) Inventor: Manhing Chau, Tianjin (CN)

(73) Assignee: MEMSEN ELECTRONICS INC., Tianjin (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/387,944

(22) Filed: Apr. 18, 2019

(65) Prior Publication Data

US 2019/0242770 A1  Aug. 8, 2019

Related U.S. Application Data

(62) Division of application No. 15/013,382, filed on Feb. 2, 2016, now abandoned.

(30) Foreign Application Priority Data

Feb. 16, 2015  (CN) .......................... 201510084520.X

(51) Int. Cl.
  *G01P 15/08* (2006.01)
  *G01L 9/00* (2006.01)

(52) U.S. Cl.
  CPC .......... *G01L 9/0073* (2013.01); *G01L 9/0042* (2013.01)

(58) Field of Classification Search
  USPC ....................................................... 257/417
  See application file for complete search history.

(56) References Cited

U.S. PATENT DOCUMENTS

| 3,808,480 A | 4/1974 | Johnston |
| 9,728,513 B2 * | 8/2017 | Lee .......................... H01L 21/56 |

(Continued)

FOREIGN PATENT DOCUMENTS

| CN | 102158787 A | 8/2011 |
| CN | 102359836 A | 2/2012 |

(Continued)

OTHER PUBLICATIONS

Chinese Office Action corresponding to Application No. 201510084520.X; dated Aug. 1, 2016, with English translation.

(Continued)

*Primary Examiner* — Niki H Nguyen
(74) *Attorney, Agent, or Firm* — Cantor Colburn LLP

(57) ABSTRACT

Provided are a MEMS pressure sensor and a method for forming the same. The method includes: preparing a first substrate including a first surface and a second surface opposite to each other; preparing a second substrate including a third surface and a fourth surface opposite to each other; bonding the first surface and the third surface with each other and forming a cavity between the first substrate and the pressure sensing region of the second substrate; thinning the second substrate from the fourth surface by partially removing the second base, to form a fifth surface opposite to the third surface; and forming a first conductive plug passing through the second substrate from the side of the fifth surface of the second substrate to the at least one conductive layer.

20 Claims, 11 Drawing Sheets

(56) References Cited

U.S. PATENT DOCUMENTS

| | | | | |
|---|---|---|---|---|
| 2003/0001251 | A1* | 1/2003 | Cheever | H01L 23/04 257/685 |
| 2009/0146227 | A1* | 6/2009 | Igarashi | G01P 15/125 257/415 |
| 2012/0042731 | A1* | 2/2012 | Lin | B81C 1/00309 73/718 |
| 2013/0334626 | A1 | 12/2013 | Weber | |
| 2014/0227817 | A1 | 8/2014 | Chien et al. | |
| 2014/0245841 | A1 | 9/2014 | Wittig | |
| 2015/0329355 | A1* | 11/2015 | Hammond | B81C 1/00269 156/235 |
| 2016/0107881 | A1* | 4/2016 | Thompson | B81B 7/007 257/418 |

FOREIGN PATENT DOCUMENTS

| | | |
|---|---|---|
| CN | 102967729 A | 3/2013 |
| CN | 103508408 A | 1/2014 |
| CN | 104236787 A | 12/2014 |
| EP | 2778641 A2 | 9/2014 |

OTHER PUBLICATIONS

TW First Office Action corresponding to Application No. 105103526; dated Jul. 31, 2017.
USPTO Advisory Action corresponding to U.S. Appl. No. 15/013,382; dated Apr. 27, 2018.
USPTO Final Office Action corresponding to U.S. Appl. No. 15/013,382; dated Jan. 22, 2018.
USPTO Non-Final Office Action corresponding to U.S. Appl. No. 15/013,382; dated Jan. 24, 2019.
USPTO Non-Final Office Action corresponding to U.S. Appl. No. 15/013,382; dated Jun. 15, 2018.
USPTO Non-Final Office Action corresponding to U.S. Appl. No. 15/013,382; dated Jun. 29, 2017.
USPTO Restriction Requirement corresponding to U.S. Appl. No. 15/013,382; dated Mar. 24, 2017.

* cited by examiner

MEMS PRESSURE SENSOR AND METHOD FOR FORMING THE SAME

CROSS REFERENCE TO RELATED APPLICATIONS

The present application is a divisional application of U.S. patent application Ser. No. 15/013,382, filed on Feb. 2, 2016, the entire contents of which are incorporated herein by reference. The 15/013,382 application claims the priority under 35 U.S.C. § 119(a) and 35 U.S.C. § 365(b) from Chinese Patent Application No. 201510084520.X, filed Feb. 16, 2015, the entire contents of which are incorporated herein by reference.

FIELD

The present disclosure relates to the technical field of semiconductor fabrication, and in particular to a Micro-Electro Mechanical System (abbreviated to MEMS) pressure sensor and a method for forming the MEMS pressure sensor.

BACKGROUND

A MEMS is a device which acquires and processes information and performs operations. A sensor in the MEMS can receive external information such as pressure, location, speed, acceleration, magnetic field, temperature or humidity, and convert the obtained external information into electrical signals to be processed in the system. An example of a MEMS device may include a temperature sensor, a pressure sensor, a humidity sensor and the like.

The cost performance of a MEMS pressure sensor can be greatly improved by reduced size, increased precision and utilization of a process that is compatible with a fabrication process of an integrated circuit chip. Currently, MEMS pressure sensors include a piezoresistive type pressure sensor and a capacitive type pressure sensor.

The capacitive type pressure sensor has a high measurement accuracy and a low power consumption. A conventional capacitive type pressure sensor includes a substrate, a first electrode layer arranged on a surface of the substrate, and a second electrode layer arranged on the surface of the substrate and on a surface of the first electrode layer. A cavity is formed between the first electrode layer and the second electrode layer, and the first electrode layer and the second electrode layer are electrically isolated from one another with the cavity.

A capacitive structure is formed with the first electrode layer, the second electrode layer and the cavity. The second electrode layer may be deformed under a pressure, which results in a change of a distance between the first electrode layer and second electrode layer and a change of a capacitance value of the capacitive structure. Since the pressure on the second electrode layer corresponds to the capacitance value of the capacitive structure, the pressure on the second electrode layer can be converted into an electrical signal output by the capacitive structure.

In addition, the electrical signal is transmitted between a pressure sensor chip and a signal processing circuit, so that the electrical signal output by the pressure sensor chip is processed. The pressure sensor chip and the signal processing circuit chip are packaged in a system to form a MEMS capacitive type pressure sensor.

In the existing methods for fabricating a MEMS pressure sensor, processes for fabricating the pressure sensor chip and the signal processing circuit are different, and it is difficult to achieve a monolithic integration. Moreover, in a case that an integrated circuit and a pressure sensor are fabricated on a single substrate, the existence of the pressure sensor creates difficulty in making, changing and improving the integrated circuit, and the integrated circuit on the same substrate makes it difficult to fabricate a small pressure sensor. Therefore, a process for fabricating an integrated circuit and a pressure sensor on a single chip is complicated and a device formed by the current process has a large size, thereby increasing its fabrication cost.

In a case that the pressure sensor and the circuit are integrated on a single substrate, if the pressure sensor is fabricated before the circuit is fabricated, a process for fabricating the pressure sensor often affects the substrate and causes a difficulty in fabricating the integrated circuit, thereby reducing production yield; alternatively, if the integrated circuit is fabricated before the pressure sensor is fabricated, the integrated circuit may limit greatly the choice of materials of the pressure sensor and the temperature in a process for fabricating the pressure sensor, thereby decreasing the performance of the pressure sensor.

Hence, there is an urgent need for a method and a structure for effectively integrating a pressure sensor and an integrated circuit.

SUMMARY

The present disclosure provides a MEMS pressure sensor and a method for fabricating the MEMS pressure sensor. In the method for fabricating the MEMS pressure sensor, the MEMS pressure sensor structure and the circuit fabrication processes are independent from one another, selection of materials is more flexible, production yield is high and a subsequent integrating process is simple, thereby improving the performance and reliability of the formed integrated pressure sensor, and reducing the size and process cost.

In order to address the existing issue, the present disclosure provides a method for forming a MEMS pressure sensor. The method includes: preparing a first substrate, where the first substrate includes a first surface and a second surface opposite to the first surface, and the first substrate includes at least one conductive layer arranged on the side of the first surface of the first substrate; preparing a second substrate, where the second substrate includes a third surface and a fourth surface opposite to the third surface, the second substrate includes a second base and a pressure-sensing electrode arranged on or above the second base, the second substrate includes a pressure sensing region in which the pressure-sensing electrode is arranged, and the pressure-sensing electrode is arranged on the side of the third surface of the second substrate; bonding the first surface of the first substrate and the third surface of the second substrate with each other; forming a cavity between the first substrate and the pressure sensing region of the second substrate; removing the second base to form a fifth surface opposite to the third surface of the second substrate; and forming a first conductive plug passing through the second substrate from the side of the fifth surface of the second substrate to the at least one conductive layer, where the first conductive plug is used to electrically connect the conductive layer to the pressure-sensing electrode.

Optionally, the second substrate may further include a fixed electrode corresponding to the pressure-sensing electrode and the cavity is formed between the pressure-sensing electrode and the fixed electrode.

Optionally, the first substrate may further include a fixed electrode arranged on the side of the first surface of the first substrate; when the first surface of the first substrate and the third surface of the second substrate are bonded with each other, the fixed electrode corresponds to the pressure-sensing electrode and the cavity is formed between the pressure-sensing electrode and the fixed electrode.

Optionally, the forming the cavity may include: before the first surface of the first substrate and the third surface of the second substrate are bonded with each other, forming a first opening on the side of the third surface of the second substrate or on the side of the first surface of the first substrate, or, forming the first opening on both the side of the first surface of the first substrate and the side of the third surface of the second substrate, with a location of the first opening corresponding to a location of the pressure sensing region.

Optionally, the first substrate may further include a circuit.

Optionally, the preparing the second substrate may include: preparing a semiconductor-on-insulator substrate, where the semiconductor-on-insulator substrate includes a base, an insulating layer arranged on a surface of the base and a semiconductor layer arranged on a surface of the insulating layer; and forming a pressure-sensing electrode in the semiconductor layer, with the base being the second base.

Optionally, the second substrate may further include a second bonding layer arranged on the side of the third surface; or, the first substrate may include a first bonding layer arranged on the side of the first surface; or, the second substrate may further include a second bonding layer arranged on the side of the third surface and the first substrate may include a first bonding layer arranged on the side of the first surface.

Optionally, at least one of the first bonding layer and the second bonding layer may be comprised of an insulating material.

Optionally, the first surface of the first substrate and the third surface of the second substrate may be bonded with each other by an adhesive bonding process, and the first bonding layer or the second bonding layer may be an adhesive bonding layer which is comprised of an insulating material, a semiconductor material, a metal material or an organic material.

Optionally, the first surface of the first substrate and the third surface of the second substrate may be bonded with each other by a direct-bonding process.

Optionally, the first substrate may include a self-test electrode, and a location of the self-test electrode may correspond to a location of the pressure sensing region after the first surface of the first substrate and the third surface of the second substrate are bonded with each other.

Optionally, the second substrate may further include a reference unit region, a cavity may be formed between the first substrate and the reference unit region of the second substrate when the first surface of the first substrate and the third surface of the second substrate are bonded with each other, and a deformation on a portion of the second substrate corresponding to the reference unit region may be less than a deformation on a portion of the second substrate corresponding to the pressure sensing region under a same external pressure.

Optionally, the method may further include: forming a second opening passing through the first substrate, where a location of the second opening corresponds to a location of the pressure sensing region of the second substrate after the first surface of the first substrate and the third surface of the second substrate are bonded with each other.

Optionally, the method may further include: forming a fourth conductive plug passing through the first substrate from the side of the second surface of the first substrate to the at least one conductive layer.

Accordingly, the present disclosure further provides a method for forming a MEMS pressure sensor. The method includes: preparing a first substrate, where the first substrate includes a first surface and a second surface opposite to the first surface, and the first substrate includes at least one conductive layer arranged on the side of the first surface of the first substrate; preparing a second substrate, where the second substrate includes a third surface and a fourth surface opposite to the third surface, the second substrate includes a second base and a pressure-sensing electrode arranged on or above or in the second base, the second substrate includes a pressure sensing region in which the pressure-sensing electrode is arranged, and the pressure-sensing electrode is arranged on the side of the third surface of the second substrate; bonding the first surface of the first substrate and the third surface of the second substrate with each other; forming a cavity between the first substrate and the pressure sensing region of the second substrate; thinning the second substrate from the fourth surface by partially removing the second base, to form a fifth surface opposite to the third surface of the second substrate; and forming a first conductive plug passing through the second substrate from the side of the fifth surface of the second substrate to the at least one conductive layer, where the first conductive plug is used to electrically connect the conductive layer to the pressure-sensing electrode.

Optionally, the second substrate may further include a fixed electrode corresponding to the pressure-sensing electrode and the cavity may be formed between the pressure-sensing electrode and the fixed electrode.

Optionally, the first substrate may further include a fixed electrode arranged on the side of the first surface of the first substrate; when the first surface of the first substrate and the third surface of the second substrate are bonded with each other, the fixed electrode may correspond to the pressure-sensing electrode and the cavity may be formed between the pressure-sensing electrode and the fixed electrode.

Optionally, the forming the cavity may include: before the first surface of the first substrate and the third surface of the second substrate are bonded with each other, forming a first opening on the side of the third surface of the second substrate or on the side of the first surface of the first substrate, or, forming the first opening on both the side of the first surface of the first substrate and the side of the third surface of the second substrate e, with a location of the first opening corresponding to a location of the pressure sensing region.

Optionally, the first substrate may further include a circuit.

Optionally, a third opening may be formed in the second substrate after the second substrate is thinned from the fourth surface, with a location of the third opening corresponding to a location of the pressure sensing region.

Optionally, the preparing the second substrate may include: preparing a semiconductor-on-insulator substrate, where the semiconductor-on-insulator substrate includes a base, an insulating layer arranged on a surface of the base and a semiconductor layer arranged on a surface of the insulating layer; and forming a pressure-sensing electrode in the semiconductor layer, with the base being the second base.

Optionally, the second substrate may further include a second bonding layer arranged on the side of the third surface; or, the first substrate may include a first bonding layer arranged on the side of the first surface; or, the second substrate may further include a second bonding layer arranged on the side of the third surface and the first substrate may include a first bonding layer arranged on the side of the first surface.

Optionally, at least one of the first bonding layer and the second bonding layer is comprised of an insulating material.

Optionally, the first surface of the first substrate and the third surface of the second substrate may be bonded with each other by an adhesive bonding process, and the first bonding layer or the second bonding layer may be an adhesive bonding layer which is comprised of an insulating material, a semiconductor material, a metal material or an organic material.

Optionally, the first surface of the first substrate and the third surface of the second substrate may be bonded with each other by a direct-bonding process.

Optionally, the first substrate may further include a self-test electrode, with a location of the self-test electrode corresponding to a location of the pressure sensing region after the first surface of the first substrate and the third surface of the second substrate are bonded with each other.

Optionally, the second substrate may further include a reference unit region, a cavity may be formed between the first substrate and the reference unit region of the second substrate when the first surface of the first substrate and the third surface of the second substrate are bonded with each other, and a deformation on a portion of the second substrate corresponding to the reference unit region may be less than a deformation on a portion of the second substrate corresponding to the pressure sensing region under a same external pressure.

Optionally, the method may further include: forming a second opening passing through the first substrate, where a location of the second opening corresponds to a location of the pressure sensing region of the second substrate after the first surface of the first substrate and the third surface of the second substrate are bonded with each other.

Optionally, the method may further include: forming at least one fifth through hole passing through the second base, on the side of the fifth surface of the second substrate, with a location of the fifth through hole corresponding to a location of the pressure sensing region.

Optionally, the method may further include: forming a fourth conductive plug passing through the first substrate from the side of the second surface of the first substrate to the at least one conductive layer.

Accordingly, the present disclosure further provides a Micro-Electro Mechanical System (MEMS) pressure sensor. The MEMS pressure sensor includes: a first substrate, where the first substrate includes a first surface and a second surface opposite to the first substrate, and the first substrate includes at least one conductive layer arranged on the side of the first surface of the first substrate; a second substrate, where the second substrate includes a third surface and a fifth surface opposite to the third surface, the second substrate includes a pressure-sensing electrode, and the second substrate includes a pressure sensing region in which the pressure-sensing electrode is arranged, the first surface of the first substrate and the third surface of the second substrate are bonded with each other; a cavity formed between the first substrate and the pressure sensing region of the second substrate; and a first conductive plug passing through the second substrate from the side of the fifth surface of the second substrate to the at least one conductive layer, where the first conductive plug is used to electrically connect the conductive layer to the pressure-sensing electrode.

Optionally, the second substrate may further include a fixed electrode corresponding to the pressure-sensing electrode and the cavity may be formed between the pressure-sensing electrode and the fixed electrode.

Optionally, the first substrate may further include a fixed electrode arranged on the side of the first surface of the first substrate; the fixed electrode may correspond to the pressure-sensing electrode and the cavity may be formed between the pressure-sensing electrode and the fixed electrode.

Optionally, the first substrate may further include a circuit.

Optionally, the second substrate may further include a second bonding layer arranged on the side of the third surface; or, the first substrate may include a first bonding layer arranged on the side of the first surface; or, the second substrate may further include a second bonding layer arranged on the side of the third surface and the first substrate may include a first bonding layer arranged on the side of the first surface.

Optionally, at least one of the first bonding layer and the second bonding layer may be comprised of an insulating material.

Optionally, the first bonding layer or the second bonding layer may be an adhesive bonding layer which is comprised of an insulating material, a semiconductor material, a metal material or an organic material.

Optionally, the first bonding layer may be a bonding layer; or, the second bonding layer may be a bonding layer; or, the first bonding layer and the second bonding layer may be bonding layers.

Optionally, the first substrate may further include a self-test electrode, with a location of the self-test electrode corresponding to a location of the pressure sensing region of the second substrate.

Optionally, the second substrate may further include a reference unit region, a cavity may be formed between the first substrate and the reference unit region of the second substrate, and a deformation on a portion of the second substrate corresponding to the reference unit region may be less than a deformation on a portion of the second substrate corresponding to the pressure sensing region.

Optionally, the MEMS pressure sensor may further include: a second opening passing through the first substrate, with a location of the second opening corresponding to a location of the pressure sensing region of the second substrate.

Optionally, the MEMS pressure sensor may further include: a fourth conductive plug passing through the first substrate from the side of the second surface of the first substrate to the at least one conductive layer.

Accordingly, the present disclosure further provides a MEMS pressure sensor. The MEMS pressure sensor includes: a first substrate, where the first substrate includes a first surface and a second surface opposite to the first surface, and the first substrate includes at least one conductive layer arranged on the side of the first surface of the first substrate; a second substrate, where the second substrate includes a third surface and a fifth surface opposite to the third surface, the second substrate includes a second base and a pressure-sensing electrode arranged on or above or in the second base, and the second substrate includes a pressure sensing region in which the pressure-sensing electrode is arranged, the first surface of the first substrate and the third surface of the second substrate are bonded with each other; a cavity formed between the first substrate and the pressure sensing region of the second substrate; and a first conductive plug passing through the second substrate from the side of the fifth surface of the second substrate to the at least one conductive layer, where the first conductive plug is used to electrically connect the conductive layer to the pressure-sensing electrode.

Optionally, the second substrate may further include a fixed electrode corresponding to the pressure-sensing electrode and the cavity may be formed between the pressure-sensing electrode and the fixed electrode.

Optionally, the first substrate may further include a fixed electrode arranged on the side of the first surface of the first substrate; the fixed electrode may correspond to the pressure-sensing electrode and the cavity may be formed between the pressure-sensing electrode and the fixed electrode.

Optionally, the first substrate may further include a circuit.

Optionally, a third opening may be formed in the second substrate, with a location of the third opening corresponding to a location of the pressure sensing region.

Optionally, the second substrate may further include a second bonding layer arranged on the side of the third surface; or, the first substrate may include a first bonding layer arranged on the side of the first surface; or, the second substrate may further include a second bonding layer arranged on the side of the third surface and the first substrate may include a first bonding layer arranged on the side of the first surface.

Optionally, at least one of the first bonding layer and the second bonding layer may be comprised of an insulating material.

Optionally, the first bonding layer or the second bonding layer may be an adhesive bonding layer which is comprised of an insulating material, a semiconductor material, a metal material or an organic material.

Optionally, the first bonding layer may be a bonding layer; or, the second bonding layer may be a bonding layer; or, the first bonding layer and the second bonding layer may be bonding layers.

Optionally, the first substrate may further include a self-test electrode, with a location of the self-test electrode corresponding to a location of the pressure sensing region of the second substrate.

Optionally, the second substrate may further include a reference unit region, a cavity may be formed between the first substrate and the reference unit region of the second substrate, and a deformation on a portion of the second substrate corresponding to the reference unit region may be less than a deformation on a portion of the second substrate corresponding to the pressure sensing region.

Optionally, a second opening passing through the first substrate may be formed, with a location of the second opening corresponding to a location of the pressure sensing region of the second substrate.

Optionally, the MEMS pressure sensor may further include: at least one fifth through hole arranged on the side of the fifth surface of the second substrate and passing through the second base, with a location of the fifth through hole corresponding to a location of the pressure sensing region.

Optionally, the MEMS pressure sensor may further include: a fourth conductive plug passing through the first substrate from the side of the second surface of the first substrate to the at least one conductive layer.

Compared with the conventional technologies, technical solutions of the present disclosure have the following advantages.

In a fabrication method according to the present disclosure, a first substrate including a conductive layer and a second substrate including a pressure-sensing electrode are prepared. The conductive layer is arranged on the side of a first surface of the first substrate, and the pressure-sensing electrode is arranged on the side of a third surface of the second substrate. A stacked structure of the first substrate and second substrate can be formed by bonding the first surface of the first substrate and the third surface of the second substrate with each other. The conductive layer may be used to transmit an electrical signal output by a capacitor including the pressure-sensing electrode. After the second base is removed and a fifth surface opposite to the third surface is formed, a first conductive plug passing through the second substrate from the fifth surface of the second substrate to the conductive layer is formed to electrically connect the conductive layer and the capacitor including the pressure-sensing electrode. Since the first conductive plug is exposed in the fifth surface of the second substrate, it is easy to form subsequently a first conductive structure, which is electrically connected to the pressure-sensing electrode, at the top of the first conductive plug, and thus the pressure-sensing electrode is electrically connected to the conductive layer.

The conductive layer is formed in the first substrate, the pressure-sensing electrode is formed in the second substrate, and the first substrate is stacked with the second substrate by bonding the first surface of the first substrate and the third surface of the second substrate with each other. Therefore, it is avoided to form a conductive layer, a fixed electrode, a pressure-sensing electrode corresponding to the fixed electrode and a cavity between the pressure-sensing electrode and the base in a layer by layer manner on a single base, thereby reducing the difficulty of process and, in particular, reducing the difficulty of a process for forming the cavity. Furthermore, it can be avoided that a temperature in a process for forming the first substrate limits or affects a fabrication process of the second substrate. In this case, selection of materials and processes for the second substrate and the pressure-sensing electrode in the second substrate is more flexible, and the performance of the formed pressure-sensing electrode is improved.

Since the first surface of the first substrate is in contact with the third surface of the second substrate, a contact area between the first surface and the third surface is large and a bonding strength between the first substrate and the second substrate is high. In this case, it is not easy to bend, break or deform a stacked structure of the first substrate and the second substrate, thereby providing a more stable and reliable structure of the formed pressure sensor and improving the durability of the formed pressure sensor.

With the above method, the distance between the fourth surface of the second substrate and the second surface of the first substrate is short, thereby reducing the size and the fabrication cost of the formed pressure sensor.

Besides, since the conductive layer is electrically connected to the capacitor including the pressure-sensing electrode by forming a first conductive plug passing through the second substrate from the fifth surface of the second substrate to the conductive layer, no additional conductive layer is necessary between the first surface of the first substrate and the third surface of the second substrate for the purpose of providing electrical connection, avoiding any negative impact that could be generated by the additional conductive layer. Since the selection of materials of the first surface of the first substrate and the third surface of the second substrate is more flexible, an excessive thermal expansion coefficient mismatch between the material of the first surface and the material of the third surface can be avoided, and the performance of the formed pressure sensor can be made more stable. Since the processes for forming the first substrate and the second substrate are more independent, the fabrication process of the pressure sensor is more compatible with various fabrication processes of integrated conductive layer, thereby reducing the fabrication cost.

Further, the second substrate may include a fixed electrode corresponding to the pressure-sensing electrode. A cavity is formed between the pressure-sensing electrode and the fixed electrode. A capacitive type pressure sensor is formed with the pressure-sensing electrode, the fixed electrode and the cavity. If a pressure is applied to the pressure-sensing electrode, a capacitance of the capacitor formed with the pressure-sensing electrode, the fixed electrode and the cavity may change, and thus an electrical signal changing with the pressure changing is outputted.

Further, the first substrate may include a fixed electrode. A first opening is formed from the third surface of the second substrate. When the first surface of the first substrate and the third surface of the second substrate are bonded with each other, a cavity is formed between the pressure-sensing electrode and the fixed electrode with the first opening and the first surface of the first substrate. The capacitive type pressure sensor is formed with pressure-sensing electrode, the fixed electrode and the cavity.

Further, the first substrate includes a circuit. An electrical signal output by the capacitor including the pressure-sensing electrode can be readily processed by the circuit since the first substrate is bonded and electrically coupled with the second substrate.

Further, the second substrate is formed by preparing a semiconductor-on-insulator substrate. Specifically, a pressure-sensing electrode can be formed by patterning a semiconductor layer in the semiconductor-on-insulator substrate. The pressure-sensing electrode may be deformed under a pressure, which leads to a change of a capacitance between the pressure-sensing electrode and the fixed electrode, thereby outputting an electrical signal related to the pressure on the pressure-sensing electrode. Since the semiconductor layer in the semiconductor-on-insulator substrate is comprised of a single crystal semiconductor material, a pressure-sensing electrode formed by doping ions into the single crystal semiconductor material has a good pressure-sensing property, thereby improving the sensitivity and the stability of the formed pressure-sensing electrode.

Further, a first opening is formed from the third surface of the second substrate or the first surface of the first substrate; or, first openings are formed from the first surface and the third surface. A cavity between the pressure-sensing electrode and fixed electrode is formed by the first opening and the first surface of the first substrate when the first surface of the first substrate and the third surface of the second substrate are bonded with each other. The first surface contacts with the third surface in a large area other than a location of the first opening. Therefore, a total thickness of the bonded first and second substrates is small, a mechanical strength of the stacked structure of the first substrate and the second substrate is high and the performance of the formed pressure sensor is improved.

Further, the first substrate may further include a self-test electrode. A location of the self-test electrode corresponds to a location of the pressure-sensing electrode after the first surface of the first substrate and the third surface of the second substrate are bonded with each other. The self-test electrode can generate an electrostatic pulling force and therefore a deformation on the pressure-sensing electrode. A capacitance changing in the pressure-sensing electrode due to this deformation can be used to detect whether the pressure-sensing electrode works normally.

Further, the second substrate includes a sensing unit region and a reference unit region, and cavities are formed in the sensing unit region and the reference unit region. For example, a cover layer may be formed on a portion of the fifth surface of the second substrate corresponding to the reference unit region. In this case, a deformation of the pressure-sensing electrode in the reference unit region due to an external pressure can be avoided or reduced, however, a capacitance of the pressure-sensing electrode in the reference unit region may change due to a factor other than pressure. An electrical signal generated due to the external pressure can be obtained by subtracting the electrical signal output by the pressure-sensing electrode in the reference unit region from an electrical signal output by the pressure-sensing electrode in the sensing unit region. Therefore, the accuracy of the formed pressure sensor is improved.

Further, a second opening in the first substrate is formed. A location of the second opening corresponds to a location of the pressure sensing region after the first surface of the first substrate and the third surface of the second substrate are bonded with each other. Since the second opening is exposed to an external environment, two sides of a pressure-sensing electrode can acquire pressures from the external environment and the pressure-sensing electrode can acquire a signal representing a difference between the pressures on the two sides of the pressure-sensing electrode. In this case, the formed pressure sensor can serves as a differential pressure sensor.

In another fabrication method according to the present disclosure, a first substrate including a conductive layer and a second substrate including a pressure-sensing electrode are prepared. A stacked layer structure of the first and second substrates can be formed by bonding a first surface of the first substrate and a third surface of the second substrate with each other. The conductive layer can transmit an electrical signal output from a capacitor including the pressure-sensing electrode. In order to electrically connect the conductive layer to the pressure-sensing electrode, a first conductive plug passing through the second substrate from a fifth surface of the second substrate to the conductive layer is formed after a second base is thinned partially and the fifth surface is formed. Since the first conductive plug is exposed in the fifth surface of the second substrate, it is easy to form subsequently a first conductive structure, which is electrically connected to the pressure-sensing electrode, at the top of the first conductive plug, and thus the pressure-sensing electrode is electrically connected to the conductive layer. Since the first surface is in contact with the third surface in a large area, the mechanical strength of the stacked structure of the first substrate and the second substrate is high and the formed pressure sensor has a stable structure and an improved durability. In addition, the size of the formed pressure sensor is small since a distance between the fifth surface of the second substrate and a second surface of the first substrate is short. Since the selection of materials of the first surface and a third surface is more flexible, an excessive thermal expansion coefficient mismatch between the material of the first surface and the material of the third surface can be avoided, and the performance of the formed pressure sensor can be made more stable.

Further, the second substrate includes a third opening, with a location of the third opening corresponding to a location of the pressure sensing region. Since regions other than the pressure sensing region are covered by the second base, a distance from the pressure-sensing electrode to the external environment may be increased while the pressure-sensing electrode acquires an external pressure, thereby protecting the pressure-sensing electrode and avoiding a wear or other damages on the pressure-sensing electrode and a protective layer on a surface of the pressure-sensing electrode.

A structure according to the present disclosure includes a first substrate including a conductive layer and a second substrate including a pressure-sensing electrode. The conductive layer is arranged on the side of a first surface of the first substrate. The first surface of the first substrate and a third surface of the second substrate are bonded with each other. Therefore, the first substrate and the second substrate are stacked with each other, and the conductive layer is used to transmit an electrical signal output from a capacitor including the pressure-sensing electrode. A first conductive plug passing through the second substrate from a fifth surface of the second substrate to the conductive layer is formed, and hence the pressure-sensing electrode can be electrically connected to the conductive layer via the first conductive plug and a first conductive structure. Since the first surface is in contact with the third surface in a large area, a mechanical strength of the stacked structure of the first substrate and the second substrate is high and the formed pressure sensor has a stable structure and an improved durability. In addition, the size of the formed pressure sensor is small since a distance between a fifth surface of the second substrate and a second surface of the first substrate is short. Since the selection of materials of the first surface and the third surface is more flexible, an excessive thermal expansion coefficient mismatch between the material of the first surface and the material of the third surface can be avoided, and the performance of the formed pressure sensor can be made more stable.

Another structure according to the present disclosure includes a first substrate including a conductive layer, and a second substrate including a second base and a pressure-sensing electrode arranged on or above the second base. The conductive layer is arranged on the side of a first surface of the first substrate, and the pressure-sensing electrode is arranged on the side of a third surface of the second substrate. Since the first surface of the first substrate and the third surface of the second substrate are bonded with each other, the first substrate is stacked with the second substrate, and the conductive layer is used to transmit an electrical signal output from a capacitor including the pressure-sensing electrode. The pressure-sensing electrode can be protected by the second base since the second base is arranged on the side of a fifth surface of the second substrate. In addition, a first conductive plug passing through the second substrate from the fifth surface of the second substrate to the conductive layer is formed, and hence the capacitor including the pressure-sensing electrode can be electrically connected to the conductive layer via the first conductive plug and a first conductive structure. Since the first surface is in contact with the third surface in a large area, the mechanical strength of the first and second substrates is high and the formed pressure sensor has a stable structure and an improved durability. Furthermore, no extra space exists between the first surface of the first substrate and the third surface of the second substrate, and a distance between the fifth surface of the second substrate and a second surface of the first substrate is short, and hence the size of the formed pressure sensor is small. Since the selection of materials of the first surface and a third surface is more flexible, an excessive thermal expansion coefficient mismatch between the material of the first surface and the material of the third surface can be avoided, and the performance of the formed pressure sensor can be more stable.

DETAILED DESCRIPTION OF EMBODIMENTS

Figure 1:
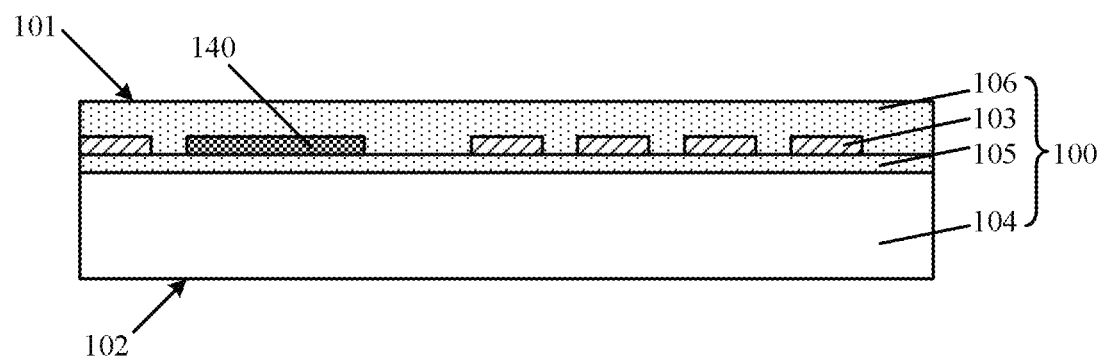
FIGS. 1 to FIG. 9 are schematic cross-sectional diagrams of a MEMS pressure sensor in a fabrication process according to an embodiment of the present disclosure.

As described in the Background, in the existing methods for fabricating a MEMS capacitive type pressure sensor, a process of integrating a pressure sensor chip with a signal processing circuit is complicated and the size of the formed device is large.

In an existing method for fabricating a MEMS capacitive type pressure sensor, a pressure sensor chip and a signal processing circuit chip are fabricated separately, and then are placed on a packaging substrate having a cavity, and are connected to each other using a wirebonding lead. The sensor chip and the signal processing circuit chip after being connected to each other are coated with a layer of protective gel, hence to be surrounded by the protective gel. After the protective gel is coated, a plastic or metal cover is placed outside the protective gel for cover/sealing. In another existing embodiment, the pressure sensor chip and the signal processing circuit chip may be placed on a flat packaging substrate and are connected to each other using the wirebonding lead, and then the pressure sensor chip and the signal processing circuit chip are coated with a layer of protective soft gel and are covered with a metal shell.

However, in fabricating the above MEMS capacitive type pressure sensor, the pressure sensor chip and the signal processing circuit chip are arranged separately side by side on a surface of the packaging substrate. In this case, the formed MEMS pressure sensor has a large size, which cannot meet advanced miniaturization requirement for the MEMS pressure sensors. Furthermore, after being placed on the packaging substrate, the pressure sensor chip and the signal processing circuit chip have to be protected using the protective gel and covered with the plastic or metal cover, the fabrication process is complicated and it is not easily compatible with monolithic integration using various integrated circuit fabrication processes.

In order to address the above issue, the present disclosure provides a MEMS capacitive type pressure sensor and a method for forming the MEMS capacitive type pressure sensor. In the method, a first substrate including a conductive layer and a second substrate including a pressure-sensing electrode are prepared. The conductive layer is arranged on the side of a first surface of the first substrate and the pressure-sensing electrode is arranged on the side of a third surface of the second substrate. A stacked structure of the first and second substrates may be formed by bonding the first surface of the first substrate and the third surface of the second substrate with each other. The conductive layer may be used to transmit an electrical signal output from a capacitor including the pressure-sensing electrode. After a second base is removed or thinned and a fifth surface opposite to the third surface is formed, a first conductive plug passing through the second substrate from the fifth surface of the second substrate to the conductive layer is formed to electrically connect the conductive layer and the capacitor including the pressure-sensing electrode. Since the first conductive plug is exposed in the fifth surface of the second substrate, it is easy to subsequently form a first conductive structure, which is electrically connected to the pressure-sensing electrode, at the top of the first conductive plug, and thus the pressure-sensing electrode is electrically connected to the conductive layer.

The conductive layer is formed in the first substrate, and the pressure-sensing electrode is formed in the second substrate. The first substrate is stacked with the second substrate by bonding the first surface of the first substrate and the third surface of the second substrate with each other. In this case, it is avoided to form the conductive layer, a fixed electrode, the pressure-sensing electrode corresponding to the fixed electrode and a cavity between the pressure-sensing electrode and the fixed electrode in a layer by layer manner on a single base, thereby reducing a difficulty of processes and, in particular, reducing a difficulty of a process for forming the cavity. In addition, it is avoided that a temperature for forming the first substrate limits or affects a fabrication process of the second substrate. In this case, selection of materials and processes for the second substrate and the pressure-sensing electrode is more flexible, and the sensitivity of the formed pressure-sensing electrode is improved.

Since the first surface of the first substrate bonds with the third surface of the second substrate in a large area, the overall strength of a stacked structure of the first substrate and the second substrate is high. In this case, it is not easy to bend, break or deform the stacked structure of the first substrate and the second substrate, thereby improving the reliability of the structure of the formed pressure sensor and improving the durability of the formed pressure sensor.

With the above method, a distance between the fifth surface of the second substrate and the second surface of the first substrate is short, thereby reducing the size and a fabrication cost of the formed pressure sensor.

Furthermore, since the conductive layer is electrically connected to the capacitor including the pressure-sensing electrode by forming the first conductive plug passing through the second substrate from the fifth surface of the second substrate to the conductive layer, no additional conductive layer is necessary between the first surface of the first substrate and the third surface of the second substrate for the purpose of providing electrical connection, avoiding any negative impact that could be generated by the additional conductive layer. In addition, the selection of materials of the first surface of the first substrate and the third surface of the second substrate is more flexible, an excessive thermal expansion coefficient mismatch between the material of the first surface and the material of the third surface can be avoided, and the performance of the formed pressure sensor can be made more stable. Since the processes for forming the first substrate and the second substrate are more independent, the fabrication process of the pressure sensor is more compatible with various integrated circuit fabrication processes, thereby reducing the fabrication cost.

In the following, specific embodiments of the present disclosure are described in detail in conjunction with the drawings, to make the above objectives, properties and advantages of the present disclosure more apparent.

First Embodiment

FIGS. 1 to FIG. 9 are schematic cross-sectional diagram of a MEMS pressure sensor in a fabrication process according to an embodiment of the present disclosure.

Referring to FIG. 1, a first substrate 100 is prepared. The first substrate 100 includes a first surface 101 and a second surface 102 opposite to the first surface 101. The first substrate 100 includes at least one conductive layer 103 arranged on the side of the first surface 101 of the first substrate 100.

In the embodiment, the first substrate 100 further includes a fixed electrode 140 arranged on the side of the first surface 101 of the first substrate 100. When the first surface 101 of the first substrate 100 and a third surface of a second substrate are bonded with each other, the fixed electrode 140 is arranged opposite to a pressure-sensing electrode, a cavity is formed between the pressure-sensing electrode and the fixed electrode, and a pressure-sensing capacitor structure can be formed with the pressure-sensing electrode, the fixed electrode and the cavity. A capacitance of the pressure-sensing capacitor structure may change with a change of a pressure applied on the pressure-sensing electrode. In another embodiment, the fixed electrode may be formed in the second substrate.

The first substrate 100 is used to form the conductive layer 103, and the conductive layer 103 is used to transmit an electrical signal output from a capacitor including a pressure-sensing electrode.

In the embodiment, the first substrate 100 includes a first base 104, a first dielectric layer 105 arranged on a surface of the first base 104, the conductive layer 103 arranged on a surface of the first dielectric layer 105, and a first bonding layer 106 arranged on the side of the first surface 101. In the embodiment, the conductive layer 103 has a single layer structure. In another embodiment, the conductive layer may include multiple conductive layers. In this case, a first conductive plug subsequently formed may be connected to at least one conducive layer. In another embodiment, the first substrate 100 may not include the first bonding layer 106.

The first base 104 includes a silicon substrate, a silicon germanium substrate, a silicon carbide substrate, a glass substrate or an III-V group compound substrate (such as a gallium nitride substrate or a gallium arsenide substrate).

The first dielectric layer 105 is used to electrically isolate the conductive layer 103 from the first base 104. The first dielectric layer 105 may be comprised of silicon oxide, silicon nitride, silicon oxynitride, a low-k dielectric material (material with a dielectric constant in a range from 2.5 to 3.9) or an ultra low-k dielectric material (material with a dielectric constant less than 2.5). The first dielectric layer 105 may be formed by an oxidation process, a chemical vapor deposition process, a physical vapor deposition process or an atomic layer deposition process.

The conductive layer 103 may be comprised of a conductive material including a metal material, a metal compound material or a semiconductor material doped with ions. The process of forming the conductive layer 103 includes: depositing a conductive material layer on a surface of the first dielectric layer 105; forming a patterned layer on a surface of the conductive material layer, with a portion of the surface of the conductive material layer being exposed from the patterned layer; and etching the conductive material layer with the patterned layer being a mask until the first dielectric layer 105 is exposed. The conductive material layer may be formed by a chemical vapor deposition process, a physical vapor deposition process or an atomic layer deposition process. The patterned layer is a patterned photoresist layer. The conductive material layer may be etched with a dry etching process.

The process of forming the fixed electrode 140 includes: depositing a second electrode layer on a surface of the first dielectric layer 105; forming a patterned layer on a surface of the second electrode layer, with a portion of the surface of the second electrode layer being exposed from the patterned layer; and etching the second electrode layer with the patterned layer being a mask until the surface of the first dielectric layer 105 is exposed. The second electrode layer may be formed by a chemical vapor deposition process, a physical vapor deposition process or an atomic layer deposition process. The patterned layer includes a patterned photoresist layer, and the conductive material layer may be etched with a dry etching process.

In the embodiment, the fixed electrode 140 and the conductive layer 103 are arranged in a same layer and formed simultaneously. The fixed electrode 140 may be comprised of a metal material, a metal compound material or a semiconductor material doped with ions. In another embodiment, the fixed electrode may be formed before or after the conductive layer is formed, and the fixed electrode and the conductive layer may be arranged in different layers.

The first bonding layer 106 protects the conductive layer 103, and is to be bonded with a second bonding layer of a surface of a second substrate subsequently, to bond the first substrate 100 and the second substrate with each other. The first bonding layer 106 has a flat surface, that is, the first surface 101 of the first substrate 100 is flat. A third surface of the second substrate prepared subsequently is also flat. In this case, a contact area between the first surface 101 and the third surface is large after the first surface 101 of the first substrate 100 and the third surface of the second substrate are bonded, the strength of a stacked structure of the first surface 101 and the second substrate is high and the first surface 101 is bonded with the second substrate stably.

The first bonding layer 106 may be comprised of one or more of an insulating material, a metal material, a metal compound material and a semiconductor material. The insulating material includes silicon oxide, silicon nitride, silicon oxynitride, a low-k dielectric material or an ultra low-k dielectric material. The metal material includes one or more of copper, tungsten, aluminum, silver, titanium and tantalum. The metal compound material includes one or two of titanium nitride and tantalum nitride. The semiconductor material includes one or more of polycrystalline silicon, amorphous silicon, polycrystalline germanium, amorphous germanium, silicon germanium and silicon carbide which are doped with ions. The ions being doped include one or more of p-type ions, n-type ions, carbon ions, nitrogen ions, fluoride ions and hydrogen ions.

In an embodiment, the first bonding layer 106 is comprised of silicon oxide. The process of forming the first bonding layer includes: depositing a first bonding film partially on a surface of the first dielectric layer 105 and partially on a surface of the conductive layer 103; and forming the first bonding layer 106 by flatting the first bonding film with a chemical mechanical polishing process.

In another embodiment, the first substrate 100 may not include the first bonding layer and the second substrate prepared subsequently may include a second bonding layer.

In addition, the first substrate 100 further includes a circuit including a semiconductor device structure and an electrical interconnection structure. The conductive layer 103 may be one of conductive layers of the circuit, or, may be a conductive layer added to the circuit. The conductive layer 103 may include a conductor or a semiconductor.

In the embodiment, a second substrate is prepared. The second substrate includes a third surface and a fourth surface opposite to the third surface. The second substrate includes a second base and a pressure-sensing electrode arranged on or above the second base. The pressure-sensing electrode is arranged on the side of the third surface of the second substrate. In the following, a fabrication process of the second substrate is described.

Figure 2:
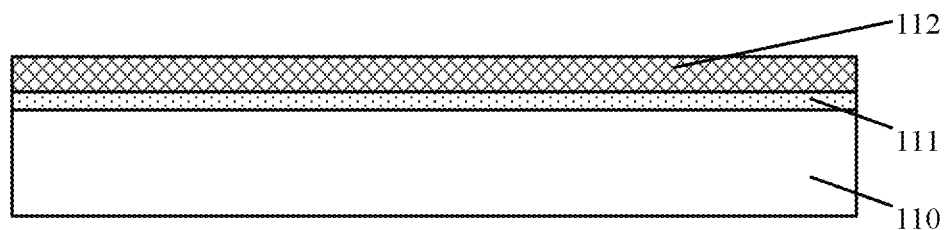

Referring to FIG. 2, a second base 110, a protective layer 111 arranged on a surface of the second base 110 and a first electrode layer 112 arranged on a surface of the protective layer 111 are prepared.

In an embodiment, the second base 110, the protective layer 11 and the first electrode layer 112 are formed with a semiconductor-on-insulator substrate. Specifically, the semiconductor-on-insulator substrate is prepared, where the semiconductor-on-insulator substrate includes a base, an insulating layer arranged on a surface of the base and a semiconductor layer arranged on a surface of the insulating layer. The base is the second base 110 and the insulating layer is the protective layer 111.

The semiconductor-on-insulator substrate includes a silicon-on-insulator substrate. The protective layer may be comprised of silicon oxide, i.e. buried oxide layer (BOX). The first electrode layer 112 may be comprised of monocrystalline silicon or monocrystalline germanium. Since the first electrode layer 112 may be comprised of monocrystalline silicon material which is doped with doping ions, a capacitance of the capacitor including the pressure-sensing electrode may change more due to a deformation of the pressure-sensing electrode, that is, the sensitivity of the formed pressure-sensing electrode is improved and the performance of the formed pressure-sensing electrode is more stable and reliable. In addition, in a case that the semiconductor layer of the semiconductor-on-insulator substrate directly serves as the first electrode layer 112 and the insulating layer serves as the protective layer 111, it is unnecessary to form a first electrode layer 112 and a protective layer 111 by an additional deposition process, thereby simplify the fabrication process.

In another embodiment, the second base 110 is a body base. The body base includes a silicon substrate, a silicon germanium substrate, a silicon carbide substrate, a glass substrate or an III-V group compound substrate (such as a gallium nitride substrate or a gallium arsenide substrate).

The protective layer 111 and the first electrode layer 112 are formed by a deposition process including a physical vapor deposition process, a chemical vapor deposition process or atomic layer deposition process. The protective layer 111 may be comprised of an insulating material such as silicon oxide, silicon nitride, silicon oxynitride, a low-k dielectric material or an ultra low-k dielectric material. The first electrode layer 112 may be comprised of a semiconductor material such as polycrystalline silicon, amorphous silicon, polycrystalline germanium, amorphous germanium, silicon carbide, gallium arsenide and silicon germanium. Besides, the first electrode layer 112 may be comprised of metal or metal compound including one or more of copper, tungsten, aluminum, silver, titanium, tantalum, titanium nitride and tantalum nitride.

Since the second base 110 is a body base, and the protective layer 111 and the first electrode layer 112 are formed by a deposition process, the second base 110, the protective layer 111 and the first electrode layer 112 may be comprised of materials of variety of selections, and meets more fabrication process needs.

Figure 3:
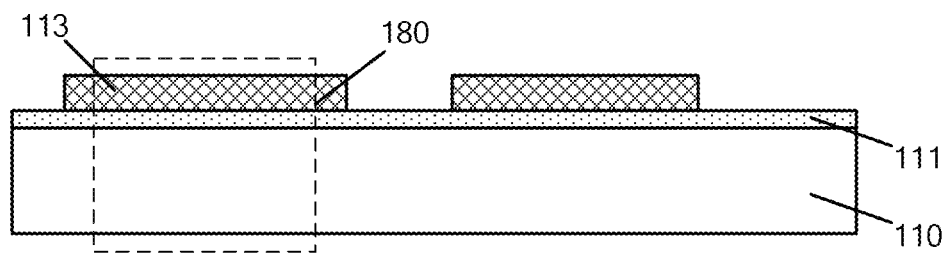

Referring to FIG. 3, the first electrode layer 112 (as shown in FIG. 2) is etched to form a pressure-sensing electrode 113.

In the embodiment, the second substrate 114 includes the second base 110, the first electrode layer 112 and a pressure sensing region 180 in which the pressure-sensing electrode 113 is arranged. In addition, an electrode interconnection layer may be formed by etching the first electrode layer 112, and the electrode interconnection layer is electrically connected to the pressure-sensing electrode 113. A pressure sensing film is formed in the pressure sensing region 180 of the second substrate 114.

The process of forming the pressure-sensing electrode 113 includes: forming a first patterned layer on a surface of the first electrode layer 112, with a portion of the surface of the first electrode layer 112 being exposed from the first patterned layer; etching the first electrode layer 112 with the first patterned layer being a mask until the surface of the protective layer 111 is exposed, to form a pressure-sensing electrode 113; and removing the first patterned layer after the first electrode layer is etched.

The first patterned layer is a patterned photoresist layer formed by a photolithography process. Alternatively, the first patterned layer may be a mask formed by a multi-pattern mask process, such as a Self-Aligned Double Patterning (abbreviated to SADP) mask. The first patterned layer may be removed with a dry etching process or a wet etching process.

The first electrode layer 112 may be etched by an anisotropic dry etching process. In the embodiment, the first electrode layer 112 is etched until the surface of the protective layer 111 is exposed.

In the embodiment, the fixed electrode 140 in the first substrate 100 (as shown in FIG. 1) and the pressure-sensing electrode 113 serve as electrodes of a capacitor in the formed capacitive type pressure sensor. The pressure-sensing electrode 113 can be deformed with a change of a pressure on the pressure-sensing electrode 113, and thus a capacitance between the pressure-sensing electrode 113 and the fixed electrode 140 changes and an output electrical signal changes.

Figure 4:
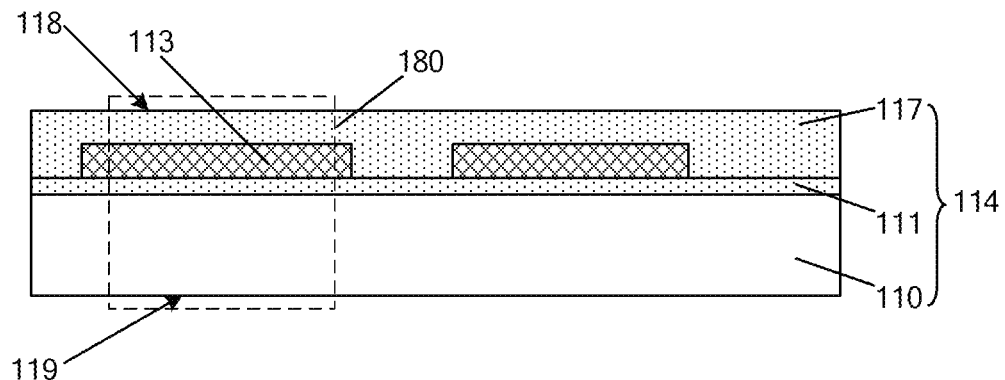

Referring to FIG. 4, a second bonding layer 117 is formed on the side of the third surface of the second substrate 114.

In the embodiment, the second substrate 114 includes the second base 110, the protective layer 111, the pressure-sensing electrode 113 and the second bonding layer 117. The second substrate 114 includes a third surface 118 and a fourth surface 119, the third surface 118 is a surface of the second bonding layer 117 and the fourth surface 119 is a surface of the second base 110. In addition, the second substrate 114 includes a pressure sensing region 180 in which the pressure-sensing electrode 113 is arranged.

In the embodiment, the second bonding layer 117 is arranged on a surface of the pressure-sensing electrode 113 and a surface of the protective layer 111. The second bonding layer 117 is used to protect the pressure-sensing electrode 113. The second bonding layer 117 is bonded with the first bonding layer 106 (as shown in FIG. 1) to bond the first substrate 100 (as shown in FIG. 1) and the second substrate 114 with each other. The surface of the second bonding layer 117 is flat, that is, the third surface 118 of the second substrate 114 is flat. In another embodiment, only the first substrate 100 includes the first bonding layer 106, or only the second substrate 114 includes the second bonding layer 117.

The second bonding layer 117 may be comprised of one or more of an insulating material, a metal material, a metal compound material and a semiconductor material. The insulating material includes silicon oxide, silicon nitride, silicon oxynitride, a low-k dielectric material or an ultra low-k dielectric material. The metal material includes one or more of copper, tungsten, aluminum, silver, titanium and tantalum. The metal compound material includes one or two of titanium nitride and tantalum nitride. The semiconductor material includes one or more of polycrystalline silicon, amorphous silicon, polycrystalline germanium, amorphous germanium, silicon germanium and silicon carbide which are doped with ions. The ions being doped include one or more of p-type ions, n-type ions, carbon ions, nitrogen ions, fluoride ions and hydrogen ions.

In an embodiment, the second bonding layer 117 may be comprised of silicon oxide. The process of forming the second bonding layer 117 includes: depositing a second bonding film partially on the surface of the protective layer 111 and partially on the surface of the pressure-sensing electrode 113; and forming a second bonding layer 117 by flattening the second bonding film by a chemical mechanical polishing process.

In the embodiment, at least one of the first bonding layer 106 and the second bonding layer 117 may be comprised of an insulating material. Alternatively, both the surface of the first bonding layer 106 and the surface of the second bonding layer 117 may be comprised of an insulating material. In the embodiment, after the first substrate 100 and the second substrate 114 are bonded with each other, a first conductive plug passing through the second substrate 114 from a fifth surface of the second substrate 114 to a surface of the conductive layer 103 is formed, and the conductive layer 103 can be electrically connected to the pressure-sensing electrode 113 via the first conductive plug and a subsequently formed first conductive structure. Therefore, no additional conductive layer is formed between a surface of the first bonding layer 106 and a surface of the second bonding layer 117 which are in contact with each other. In this case, the first bonding layer 106 and the second bonding layer 117 may be comprised of various types of material, and meets more fabrication process needs.

In another embodiment, the second substrate may not include a second bonding layer and the first substrate 100 includes a first bonding layer.

In another embodiment, a fixed electrode is formed in the second substrate. The fixed electrode is arranged in the pressure sensing region and opposite to the pressure-sensing electrode. A cavity is formed between pressure-sensing electrode and the fixed electrode. In the embodiment, it is unnecessary to form a fixed electrode in the first substrate.

Before the second bonding layer is formed, a second dielectric layer is formed on a surface of the pressure-sensing electrode 113. A fixed electrode is formed on a surface of the second dielectric layer. A cavity is formed by removing a portion of the second dielectric layer between the fixed electrode and the pressure-sensing electrode. In an embodiment, a second bonding layer is formed partially on the surface of the second dielectric layer and partially on a surface of the fixed electrode after the cavity is formed. In another embodiment, the second bonding layer may not be formed.

The process of forming the second dielectric layer includes: depositing a second dielectric film partially on the surface of the pressure-sensing electrode 113 and partially on the surface of the protective layer 111; and flattening the second dielectric film to form a second dielectric layer. The second dielectric layer may be comprised of silicon oxide, silicon nitride, silicon oxynitride, a low-k dielectric material or an ultra low-k dielectric material. The second dielectric film may be filmed by a chemical vapor deposition process, a physical vapor deposition process or an atomic layer deposition process. The second dielectric film is flattened by the chemical mechanical polishing process.

The cavity may be formed by an etching process including an isotropic etching process, and the isotropic etching process may be a wet etching process or a dry etching process. Etching rates of the isotropic etching process in various directions are similar to one another. Therefore, the second dielectric layer may be etched in a direction parallel to the surface of the second substrate to remove a portion of the second dielectric layer between the fixed electrode and the pressure-sensing electrode. Several through holes may be formed in the fixed electrode to expose a portion of a surface of the second dielectric surface. The portion of second dielectric layer at the bottom of the through hole is etched in the etching process for forming the cavity, to remove the portion of the second dielectric layer between the fixed electrode and the pressure-sensing electrode.

Figure 5:
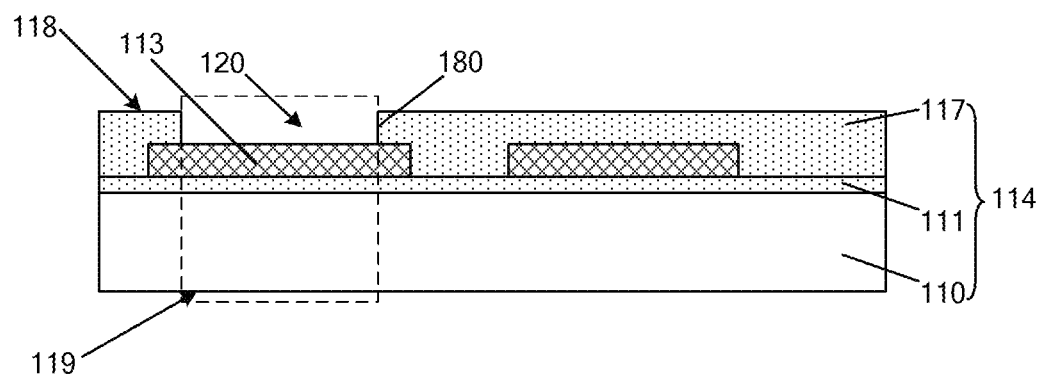

Referring to FIG. 5, a first opening 120 is formed from the third surface 118 of the second substrate 114, and a location of the first opening 120 corresponds to a location of the pressure pressure-sensing electrode 113.

In the embodiment, since the fixed electrode 140 (as shown in FIG. 1) is formed in the first substrate 100 (as shown in FIG. 1), the first opening 120 is formed from the third surface 118 of the second substrate 114. When the first substrate 100 and the second substrate 114 are bonded, a cavity is formed between the third surface 118 and the first surface 101 of the first substrate 100. A pressure in the cavity may be one atmospheric pressure or other preset pressure values. The cavity may serve as a dielectric between the pressure-sensing electrode 113 and the fixed electrode. A capacitance value of a capacitor structure formed with the cavity, the pressure-sensing electrode 113 and the fixed electrode 140 (as shown in FIG. 1) may change in a case that the pressure-sensing electrode 113 is deformed under an pressure, thereby outputting an electrical signal changing as the pressure or stress changes.

The process of forming the first opening 120 includes: forming a patterned layer on a surface of the second bonding layer 117; and etching the second bonding layer 117 with the patterned layer being a mask to form a first opening 120 in the second bonding layer 117. The patterned layer may be a patterned photoresist layer. The etching process may be a dry etching process, a wet etching process or a combination thereof.

In the embodiment, the surface of the pressure-sensing electrode 113 is exposed at the bottom of the first opening 120. In another embodiment, the surface of the pressure-sensing electrode 113 is not exposed at the bottom of the first opening 120, and the pressure-sensing electrode 113 is protected.

In another embodiment, the first opening may be formed on the side of the first surface of the first substrate, and a location of the first opening corresponds to the location of a pressure sensing region of the second substrate. In another embodiment, first openings may be formed on the side of the first surface of the first substrate and the side of a third surface of the second substrate, with locations of the first openings corresponding to the location of the pressure sensing region.

Figure 6:
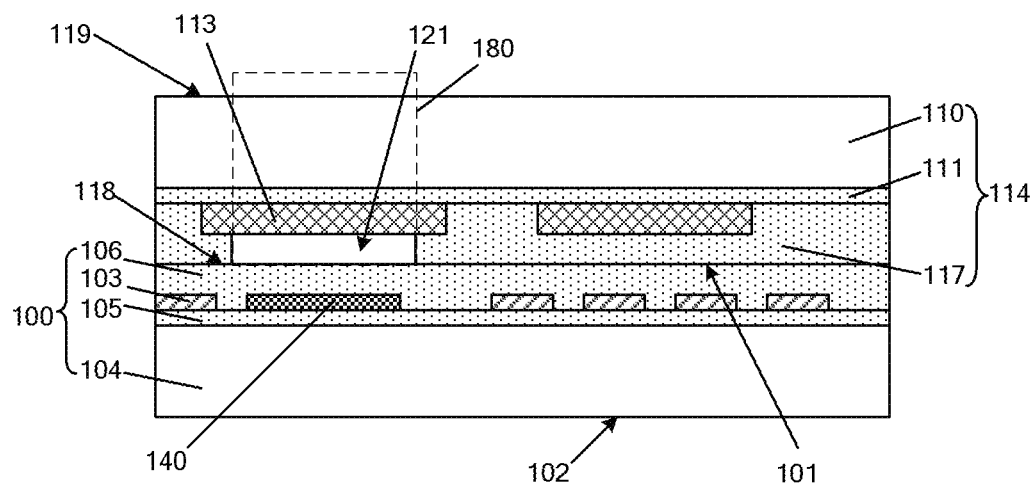

Reference is made to FIG. 6. The first surface 101 of the first substrate 100 and the third surface 118 of the second substrate are bonded with each other, and a cavity 121 is formed between the first substrate 100 and the pressure sensing region 180 of the second substrate 114.

In the embodiment, since the first opening 120 is formed from the third surface 118 of the second substrate 114 (as shown in FIG. 5), the cavity 121 is formed with the first opening 120 and the first surface 101 of the first substrate 100 when the first surface 101 of the substrate 100 and the third surface 118 of the second substrate 114 are bonded with each other.

In another embodiment, a first opening may be formed by etching the first surface 101 of the first substrate 100, with a location of the first opening corresponding to the pressure sensing region 180 in the second substrate 114. In this case, a cavity 121 is formed with the first opening and the third surface 118 of the second substrate 114 when the first surface 101 of the first substrate 100 and the third surface 118 of the second substrate are bonded with each other.

In an embodiment, the first substrate 100 and the second substrate 114 may be bonded with a direct-bonding process such as Fusion Bonding, Anodic Bonding, Eutectic Bonding or Thermal Compression Bonding. In another embodiment, the first substrate 100 and the second substrate 114 may be bonded with each other by an adhesive bonding process, and the first substrate 100 and the second substrate 114 are bonded with an adhesive bonding layer. The adhesive bonding layer may be comprised of an insulating material, a semiconductor material, a metal material or an organic material. The first bonding layer or the second bonding layer serves as the adhesive bonding layer.

In the embodiment, the surface of the first bonding layer 106 is flat, and the surface of the second bonding layer 117 is flat. The surface of the first bonding layer 106 is the first surface of the first substrate 100 and the surface of the second bonding layer 117 is the third surface of the second substrate 114. The surface of the first bonding layer 106 is in contact and bonded with the surface of the second bonding layer 117, so that the first substrate 100 and the second substrate 114 can be stacked and bonded with each other.

The cavity 121 between the first substrate 100 and the pressure sensing region 180 of the second substrate 114 is formed as a pressure reference chamber, in a case that the first substrate 100 and the second substrate 114 are bonded with each other. A pressure in the formed cavity 121 can be adjusted by adjusting an ambient pressure in bonding the first substrate 100 and the second substrate 114. After the second base 110 is removed, a pressure difference exists between a pressure applied to a surface of the protective layer 111 and the pressure in the cavity 121. The pressure-sensing electrode 113 is deformed due to the pressure difference. The deformation leads to a change in the capacitance between the pressure-sensing electrode 113 and the fixed electrode 140, which leads to a change in an electrical signal output from the capacitor structure formed by the pressure-sensing electrode 113 and the fixed electrode. Therefore, an output electrical signal changes with a change in the pressure difference between the external pressure and the pressure in the cavity 121, and an external pressure signal is detected.

Since the first surface 101 of the first substrate 100 is in contact with the third surface 118 of the second substrate 114, and the first surface 101 and the third surface 118 are flat, the first surface 101 is in contact with the third surface 118 in a large area, a bonding strength between the first substrate 100 and the second substrate 114 is high, and it is not easy to bend, break or deform a stacked structure of the first substrate 100 and the second substrate 114, thereby providing a more stable and reliable structure of the formed pressure sensor and improving the durability of the formed pressure sensor.

Furthermore, except for the formed cavity 121, the first surface 101 of the first substrate 100 mostly is in contact with the third surface 118 of the second substrate 114, and there is no extra space between the first surface 101 and the third surface 118. In this case, a distance from the fourth surface 119 of the second substrate 114 to the second surface 102 of the first substrate 100 is short, thereby reducing a thickness and a size of the formed MEMS pressure sensor and improving device integration.

In addition, no additional conductive layer is necessary between the first surface 101 of the first substrate 100 and the third surface 118 of the second substrate 114, since the conductive layer 103 is electrically connected to the pressure-sensing electrode 113 by forming the first conductive plug passing through the second substrate 114 from the fifth surface of the second substrate 114 to the conductive layer 103. In this way, no excess stress is generated between the first surface 101 and the third surface 118 due to a thermal expansion coefficient mismatch, thereby ensuring the accuracy of the electrical signal output from the capacitor including the pressure-sensing electrode 113.

The selection of materials of the first surface 101 of the first substrate 100 and the third surface 118 of the second substrate 114 is flexible, and hence the first surface 101 and the third surface 118 may be comprised of material with a small thermal expansion coefficient mismatch. In this case, no or minimal stress is generated due to the excessive thermal expansion coefficient mismatch between the material of the first surface and the material of the third surface 118, thereby providing a more stable structure of the formed MEMS pressure sensor and improving the reliability and the accuracy the formed MEMS pressure sensor. In addition, the processes for the first substrate 100 and the second substrate 114 are more flexible, the fabrication process of the formed MEMS pressure sensor is more compatible with various fabrication processes of integrated conductive layers, and the fabrication cost is reduced.

Figure 7:
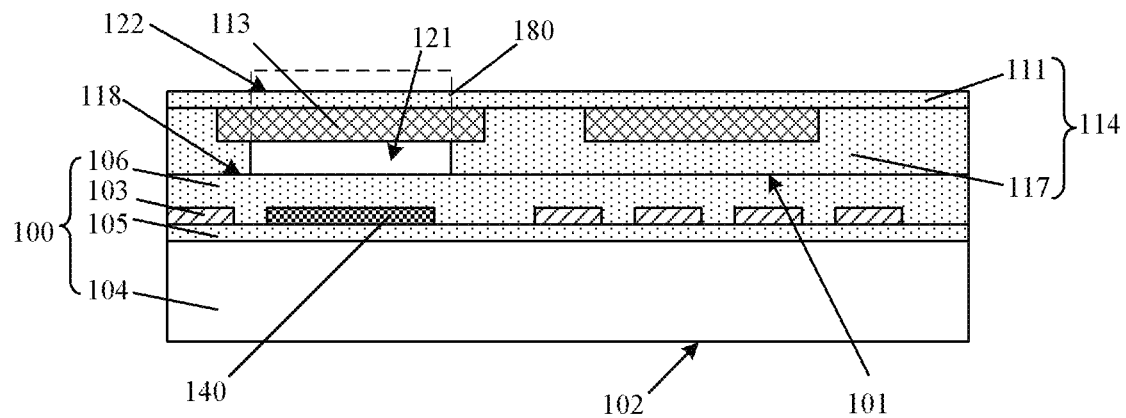

Reference is made to FIG. 7. The second base 110 (as shown in FIG. 6) is removed and a fifth surface 122 opposite to the third surface 118 of the second substrate is formed.

In the embodiment, since the protective layer 111 is located between the second base 110 and the pressure-sensing electrode 113, a surface of the protective layer 111 is exposed after the second base 110 is removed. The protective layer 111 may be comprised of an insulating material, and can protect and isolate the pressure-sensing electrode 113. The capacitance of the pressure-sensing electrode 113 changes due to a deformation of the pressure-sensing electrode 113 in a case that the protective layer 111 is applied with a pressure.

The second base 110 may be removed by a chemical mechanical polishing process or an etching process, and the etching process includes a dry etching process, a wet etching process or a combination of dry etching and wet etching. Since the second base 110 is removed from the fourth surface 119 of the second substrate 114, a fifth surface 122, i.e. the surface of the protective layer 111, is formed on the side of the second substrate 114 opposite to the third surface 118 after the second base is removed.

Figure 8:
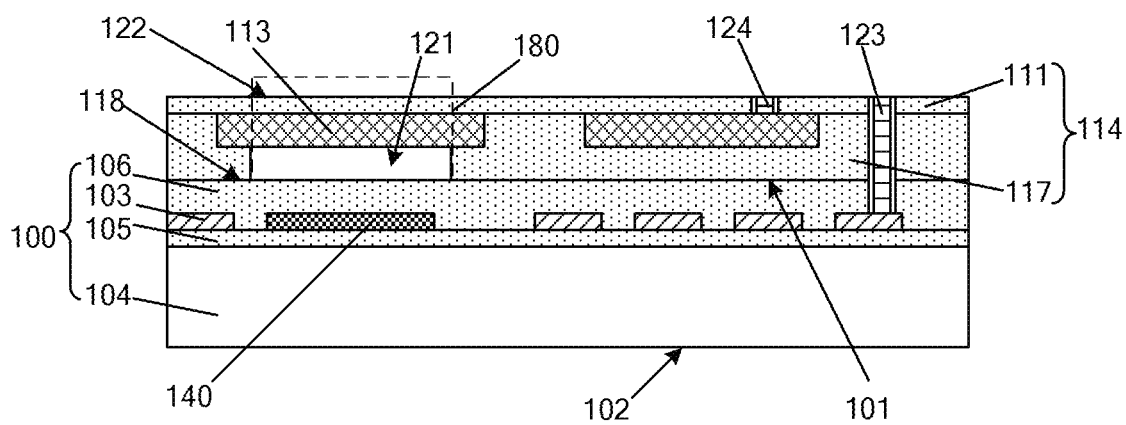

Reference is made to FIG. 8. A first conductive plug 123 passing through the second substrate 114 from the fifth surface 122 of the second substrate 114 to the at least one conductive layer 103 is formed, and the first conductive plug 123 is used to electrically connect the conductive layer 103 to the pressure-sensing electrode 113.

The first surface 101 of the first substrate 100 is in contact with the third surface 118 of the second substrate 114, and no electrical connection exists on the contacting interface between the first surface 101 and the third surface 118 when at least one of the bonding layers is an insulator, hence the first conductive plug 123 needs to be formed. One end of the first conductive plug 123 is electrically connected to the conductive layer 103 and the other end of the first conductive plug 123 is exposed in the fifth surface 122 of the second substrate 114. In this case, a first conductive structure may be directly formed partially on the fifth surface 122 and partially in the second substrate 114, so that the first conductive structure is electrically connected to the first conductive plug 123 and the pressure-sensing electrode 113, and thus the conductive layer 103 is electrically connected to the pressure-sensing electrode 113.

Since no electrical connection layer has to be made between the first surface 101 and the third surface 118, the first surface 101 is in contact with the third surface 118 in most regions other than a region of the cavity 121, and a contact area between the first surface 101 and the third surface 118 is large. In this case, the mechanical strength of the stacked structure of the first substrate 100 and the second substrate 114 is higher after they are bonded, and it is difficult to bend or crack the stacked structure of the first substrate and the second substrate. In addition, no additional electrical connection layer is necessary between the first surface 101 and the third surface 118, the first surface 101 and the third surface 118 may be comprised of material with similar thermal expansion coefficients. In this case, no excess stress or delamination is generated between the first substrate 100 due to a thermal expansion coefficient mismatch, after the first substrate 100 is bonded with the second substrate 114. Therefore, the stacked structure of the first substrate 100 and the second substrate 114 has a more stable structure, a reduced size and a high adaptability of the fabrication process thereof.

The forming the first conductive plug 123 includes: forming a patterned layer on the fifth surface 122 of the second substrate 114, with a region where the first conductive plug 123 is formed being exposed from the patterned layer; with the patterned layer as a mask, etching the protective layer 111, the second bonding layer 117 and the first bonding layer 106 until the surface of the conductive layer 103 is exposed, to form a first through hole in the protective layer 111, the second bonding layer 117 and the first bonding layer 106; forming a conductive film partially on the fifth surface 122 and partially in the first through hole, with the first through hole being filled with the conductive film; and removing a portion of the conductive film on the fifth surface 122 until the fifth surface 122 is exposed. In an embodiment, the conductive film on the fifth surface may be removed completely. In another embodiment, a portion of the conductive film may be reserved on the fifth surface 122.

An end of the first conducive plug 123 may protrude from, be recessed into or be flush with, the fifth surface 122 of the second substrate 114.

In an embodiment, an insulating layer is formed on a surface of a sidewall of the first through hole before the conductive film is formed, and then the conductive film filling up the first through hole is formed after the insulating layer is formed.

The first conductive plug 123 may be comprised of copper, tungsten, aluminum, silver or gold. The conductive film may be formed by a physical vapor deposition process, a chemical vapor deposition process, an atomic layer deposition process, an electroplating process or a chemical plating process. The conductive film may be flattened by a chemical mechanical polishing process. In addition, a first barrier layer may be formed on the surface of the sidewall of the first through hole, the conductive film is formed on a surface of the first barrier layer, and the first barrier layer may be comprised of one or more of titanium, tantalum, titanium nitride and tantalum nitride.

In the embodiment, a third conductive plug 124 passing through from the fifth surface 122 of the second substrate 114 to the electrode interconnection layer is formed. A first conductive structure is subsequently formed with the third conductive plug 124 and a subsequently-formed first conductive layer. The first conductive structure is used to electrically connect the first conductive plug 123 to the pressure-sensing electrode 113, and the pressure-sensing electrode 113 is electrically connected to the conductive layer 103.

In the embodiment, a third through hole passing through the protective layer 111 is formed while the first through hole is formed. A surface of the electrode interconnection layer is exposed at the bottom of the third through hole. The conductive film is formed in the third through hole and fills up the third through hole, and then the third conductive plug 124 is formed in the third through hole.

In an embodiment, an insulating layer may be formed on a surface of a sidewall of the third through hole before the conductive film is formed, and then the conductive film filling up the third through hole is formed after the insulating layer is formed.

In another embodiment, the third conductive plug 124 may be formed before or after the first conductive plug 123 is formed.

Figure 9:
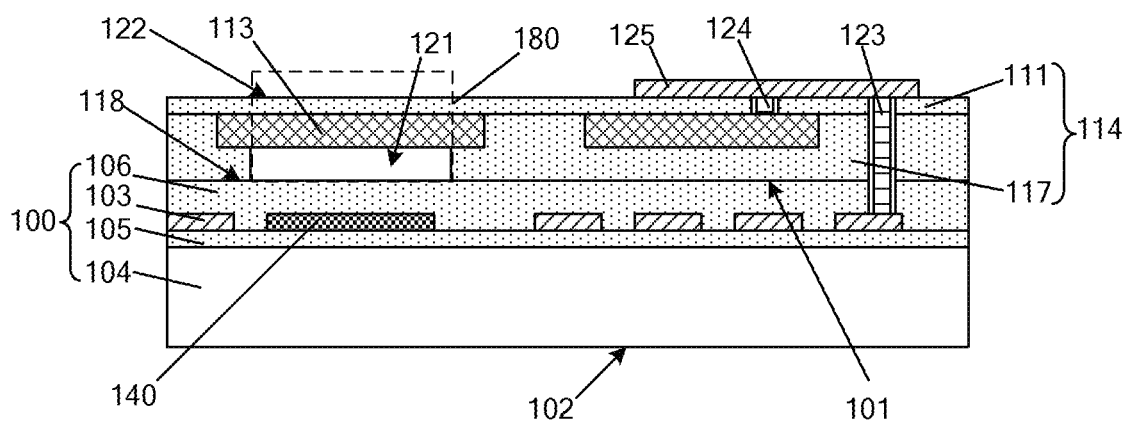

Referring to FIG. 9, a first conductive structure, which is electrically connected to the first conductive plug 123 and the pressure-sensing electrode 113, is formed.

In the embodiment, the first conductive structure includes the third conductive plug 124 and the first conductive layer 125. The first conductive layer 125 is arranged on the fifth surface 122 of the second substrate 114 and is arranged on top surfaces of the first conductive plug 123 and the third conductive plug 124. The third conductive plug 124 is electrically connected to the electrode interconnection layer, the first conductive plug 123 is electrically connected to the conductive layer 103, and the first conductive layer 125 is electrically connected to the first conductive plug 123 and the third conductive plug 124, and thus the pressure-sensing electrode 113 is electrically connected to the conductive layer 103.

The first conductive layer 125 may be comprised of metal or metal compound, which includes one or more of copper, tungsten, aluminum, silver, titanium, tantalum, titanium nitride and tantalum nitride. The forming the first conductive layer 125 includes: depositing a conductive material layer on the fifth surface 122 of the second substrate 114; forming a patterned layer on the conductive material layer with a portion of the surface of the conductive material layer being exposed from the patterned layer; etching the conductive material layer with the patterned layer being a mask until the fifth surface 122 is exposed. The conductive material layer may be formed by a chemical vapor deposition process, a physical vapor deposition process or an atomic layer deposition process. The patterned layer is a patterned photoresist layer. The conductive material layer may be etched by an anisotropic dry etching process.

The method for fabricating the MEMS pressure sensor according to the embodiment may be used to make devices suitable for multiple types of packaging, including Chip Scale Package (CSP), Quad Flat No-lead package (QFN), Dual flat no-lead package (DFN) or Small Outline Integrated Conductive layer package (SOIC).

Accordingly, the embodiment of the present disclosure further provides a MEMS pressure sensor formed according to the above method. Reference is still made to FIG. 9. The MEMS pressure sensor includes: a first substrate 100 and a second substrate 114. The first substrate 100 includes a first surface 101 and a second surface 102 opposite to the first surface 101. The first substrate 100 includes at least one conductive layer 103 arranged on the side of the first surface 101 of the first substrate 100. The second substrate 114 includes a third surface 118 and a fifth surface 122 opposite to the third surface 118, the second substrate 114 includes a pressure-sensing electrode 113, and the second substrate 114 includes a pressure sensing region 180 in which the pressure-sensing electrode 113 is arranged. The first surface 101 of the first substrate 100 and the third surface 118 of the second substrate 114 are bonded with each other and a cavity 121 is formed between the first substrate 100 and the pressure sensing region 180 of the second substrate 114. A first conductive plug 123 passing through the second substrate 114 from the fifth surface 122 of the second substrate 114 to the at least one conductive layer 103 is formed, to electrically connect the conductive layer 103 and the pressure-sensing electrode 113.

In the following, the above structure is described in detail.

In the embodiment, the first substrate 100 further includes a fixed electrode 140 arranged on the side of the first surface 101 of the first substrate 100. The fixed electrode 140 corresponds to the pressure-sensing electrode 113. The cavity 121 is formed between the pressure-sensing electrode 113 and the fixed electrode 140. In an embodiment, the first substrate 100 further includes a circuit.

In another embodiment, the second substrate further includes a fixed electrode corresponding to the pressure-sensing electrode, and a cavity is formed between the pressure-sensing electrode and the fixed electrode.

The second substrate 114 further includes a protective layer 111 arranged partially on a surface of the pressure-sensing electrode 113 and partially on a surface of the electrode interconnection layer, and a surface of the protection layer 111 is the fifth surface 122. The protective layer 111 may be comprised of an insulating material such as silicon oxide, silicon nitride, silicon oxynitride, a low-k dielectric material or an ultra low-k dielectric material.

The pressure-sensing electrode 113 may be comprised of a semiconductor material, such as monocrystalline silicon, monocrystalline germanium, III-V group compound, II-VI group compound, polycrystalline silicon, amorphous silicon, polycrystalline germanium, amorphous germanium, silicon carbide or silicon germanium.

The first conductive structure includes a third conductive plug 124 and a first conductive layer 125. The third conductive plug 124 passes through the second substrate 114 from the fifth surface 122 of the second substrate 114 to the electrode interconnection layer, and the first conductive layer 125 is arranged on the fifth surface 122 of the second substrate 114 and on top surfaces of the first conductive plug 123 and the third conductive plug 124.

The second substrate 114 further includes a second bonding layer 117 arranged on the side of the third surface 118; or the first substrate 100 includes a first bonding layer 106 arranged on the side of the first surface 101; or the second substrate 114 further includes a second bonding layer 117 arranged on the side of the third surface 118 and the first substrate 100 includes a first bonding layer 106 arranged on the side of the first surface 101. The first bonding layer 106 or the second bonding layer 117 may be comprised of one or more of an insulating material, a metal material, a metal compound material and a semiconductor material. In an embodiment, at least one of the first bonding layer 106 and the second bonding layer 117 is comprised of an insulating material.

In an embodiment, the first bonding layer 106 or the second bonding layer 117 is an adhesive bonding layer, which may be comprised of an insulating material, a semiconductor material, a metal material or an organic material. In another embodiment, the first bonding layer 106 is a bonding layer; or, the second bonding layer 117 is a bonding layer; or, the first bonding layer 106 and the second bonding layer 117 are bonding layers.

Second Embodiment

Figure 10:
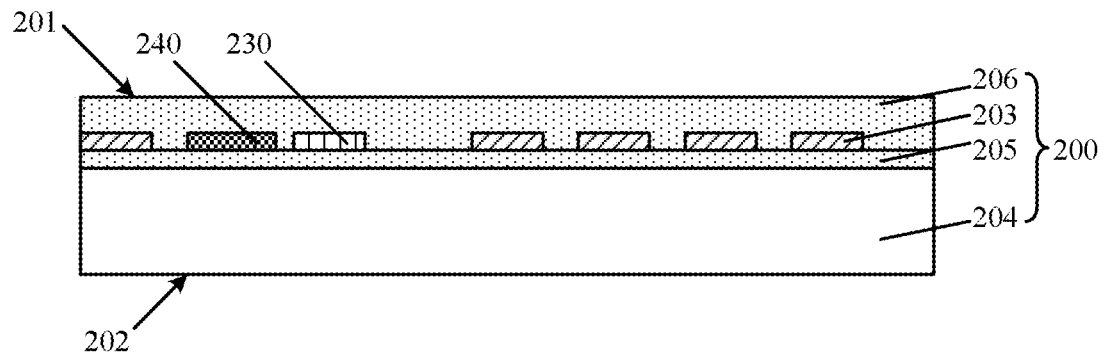
FIGS. 10 to FIG. 11 are schematic cross-sectional diagrams of a MEMS pressure sensor in a fabrication process according to an embodiment of the present disclosure.
Figure 11:
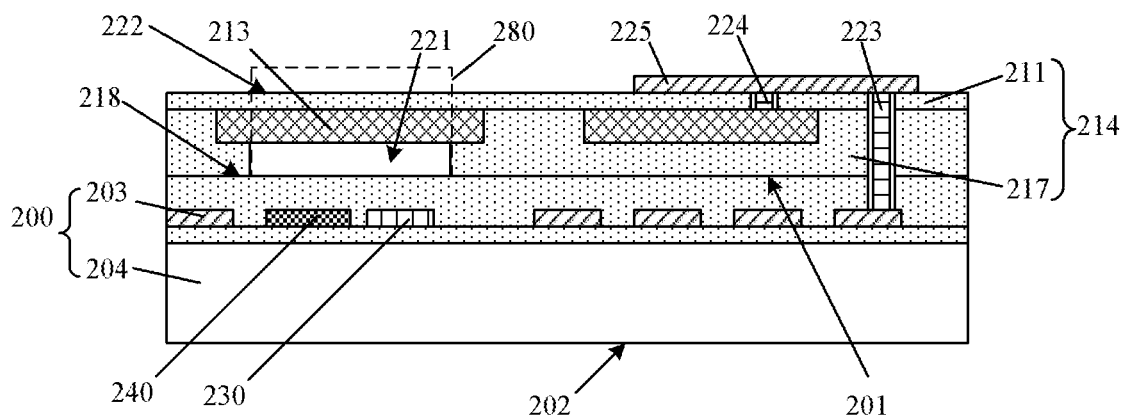

FIGS. 10 to 11 are schematic cross-sectional diagram of a MEMS pressure sensor in a fabrication process according to an embodiment of the present disclosure.

Referring to FIG. 10, a first substrate 200 is prepared. The first substrate 200 includes a first surface 201 and a second surface 202 opposite to the first surface 201. The first substrate 200 includes a self-test electrode 230, and at least one conductive layer 203 arranged on the side of the first surface 201 of the first substrate 200.

The first substrate 200 further includes a fixed electrode 240 arranged on the side of the first surface 201 of the first substrate 200. When the first surface 201 of the first substrate 200 and a third surface of a second substrate are bonded with each other, the fixed electrode 240 corresponds to the pressure-sensing electrode and a cavity is formed between the pressure-sensing electrode and the fixed electrode 240.

In addition, the first substrate 200 further includes a circuit including a semiconductor device structure and an electrical interconnection structure. The conductive layer 203 may be a conductive layer of the circuit, or, may be a conductive layer added to the circuit. The conductive layer may include a conductor or a semiconductor.

In the embodiment, the conductive layer 203 is formed on the first base 204, and a first dielectric layer 205 is arranged between the conductive layer 203 and the first base 204. The first substrate 200 may include a first bonding layer 206 arranged on the side of the first surface 201. The first base 204, the first dielectric layer 205, the conductive layer 203 and the first bonding layer 206 are the same as those described in conjunction with FIG. 1 according to the previous embodiment, which are not described herein.

A location of the self-test electrode 230 and a location of the fixed electrode 240 correspond to a location of a pressure sensing region of the second substrate. In the embodiment, the self-test electrode 230 is formed on a surface of the first dielectric layer. Since the location of the self-test electrode 230 and the location of the fixed electrode 240 correspond to the location of the pressure sensing region in the second substrate, that is, the self-test electrode 230 and the fixed electrode 240 are arranged corresponding to the pressure-sensing electrode after the first substrate 200 and the second substrate are bonded with each other.

In the embodiment, the self-test electrode 230 is located in the same layer as the conductive layer 203. In another embodiment, the self-test electrode 230 may be higher or lower than the conductive layer 203. In the embodiment, the self-test electrode 230 is located in the same layer as the fixed electrode 240. In another embodiment, the self-test electrode 230 may be higher or lower than the fixed electrode 240.

After the first substrate 200 and the second substrate are bonded, the self-test electrode 230 may generate an electrostatic pull on the pressure sensing region of the second substrate when a bias voltage is applied to the self-test electrode 230, the pressure sensing region of the second substrate is a pressure sensing film and the pressure sensing film may be deformed due to the electrostatic pull. It is detected whether the pressure-sensing electrode works normally by detecting whether the electrostatic pull leads to a change in a capacitance of the capacitor including the pressure-sensing electrode.

The self-test electrode 230 may be comprised of a metal material, a metal compound material or a semiconductor material doped with ions. The forming the self-test electrode 230 includes: depositing an electrode material layer on a surface of the first dielectric layer 205; forming a patterned layer on a surface of the electrode material layer, with a portion of the surface of the electrode material layer being exposed from the patterned layer; etching the electrode material layer with the patterned layer being a mask until the surface of the first dielectric layer 205 is exposed. The electrode material layer may be formed by a chemical vapor deposition process, a physical vapor deposition process or an atomic layer deposition process. The patterned layer is a patterned photoresist layer. The electrode material layer may be etched by an anisotropic dry etching process. In the embodiment, the self-test electrode 230, the conductive layer 203 and the fixed electrode 240 are formed simultaneously. In another embodiment, the self-test electrode may be formed before or after the conductive layer 203 is formed, or may be formed before or after the fixed electrode is formed.

Reference is made to FIG. 11. A second substrate 214 is prepared. The second substrate 214 includes a third surface 218 and a fourth surface opposite to the third surface 218. The second substrate 214 includes a second base and a pressure-sensing electrode 213 arranged on or above the second base. The second substrate 214 includes a pressure sensing region 280 in which the pressure-sensing electrode 213 is arranged. The pressure-sensing electrode is arranged on the side of the third surface 218 of the second substrate 214. The first surface 201 of the first substrate 200 and the third surface 218 of the second substrate 214 are bonded with each other, and a cavity 221 is formed between the first substrate 200 and the pressure sensing region 280 of the second substrate 214. The second base is removed to form a fifth surface 222 opposite to the third surface 218 of the second substrate 214. A first conductive plug 223 passing through the second substrate 214 from the side of the fifth surface 222 of the second substrate 214 to the at least one conductive layer 203 is formed, and the first conductive plug 223 is used to electrically connect the conductive layer 203 to the pressure-sensing electrode 213.

In the embodiment, after the first surface 201 of the first substrate 200 and the third surface 218 of the second substrate 214 are bonded with each other, the location of the self-test electrode 230 corresponds to the location of the pressure sensing region 280. In this case, the self-test electrode 230 can apply an electrostatic pull to the pressure-sensing electrode 213 to detect whether the pressure-sensing electrode works normally.

In the embodiment, the second substrate 214 further includes a protective layer 211 and a first conductive structure. The first conductive structure includes a third conductive plug 224 and a first conductive layer 225.

Steps of: preparing the second substrate 214; bonding the first substrate 200 and the second substrate 214 with each other; removing the second base; forming the first conductive plug 223 and forming the first conductive structure are the same as those described in conjunction with FIGS. 2 to FIG. 9 according to the previous embodiment, which are not described herein.

Accordingly, the embodiment of the present disclosure further provides a MEMS pressure sensor formed with the above method. Reference is still made to FIG. 11. The MEMS pressure sensor includes a first substrate 200 and a second substrate 214. The first substrate 200 includes a first surface 201 and a second surface 202 opposite to the first surface 201. The first substrate 200 includes a self-test electrode 230, and at least one conductive layer 203 arranged on the side of the first surface 201 of the first substrate 200. The second substrate 214 includes a third surface 218 and a fifth surface 222 opposite to the third surface 218. The second substrate 214 includes a pressure-sensing electrode 213. The second substrate 214 includes a pressure sensing region 280 in which the pressure-sensing electrode is arranged. The first surface 201 of the first substrate 200 and the third surface 218 of the second substrate 214 are bonded with each other and a cavity 221 is formed between the conductive layer 203 and the pressure-sensing electrode 213. The location of the self-test electrode 230 corresponds to the location of the pressure sensing region 280. A first conductive plug 223 passing through the second substrate 214 from the fifth surface 222 of the second substrate 214 to the at least one conductive layer 203 is formed, and the first conductive plug 223 is used to electrically connect the conductive layer 203 and the pressure-sensing electrode 213.

In the embodiment, the first substrate 200 further includes a fixed electrode 240 arranged on the side of the first surface 204 of the first substrate 200. When the first surface 204 of the first substrate 200 and the third surface 218 of the second substrate 214 are bonded with each other, the fixed electrode 240 corresponds to the pressure-sensing electrode 213, and the cavity 221 is formed between the pressure-sensing electrode 213 and the fixed electrode 240.

The first substrate 200, the second substrate 214, the pressure-sensing electrode 213, the first conductive plug 223 and the first conductive structure are the same as those described in the previous embodiment, which are not described herein.

The self-test electrode 230 may be comprised of a metal material, a metal compound material or a semiconductor material doped with ions. The metal material includes one or more of copper, tungsten, aluminum, silver, titanium and tantalum. The metal compound material includes one or two of titanium nitride and tantalum nitride. The semiconductor material includes one or more of polycrystalline silicon, amorphous silicon, polycrystalline germanium, amorphous germanium, silicon germanium and silicon carbide which are doped with ions. The ions being doped include p-type ions, n-type ions, carbon ions, nitrogen ions, fluoride ions and hydrogen ions.

When a bias voltage is applied to the self-test electrode 230, the self-test electrode 230 can generate an electrostatic pull on the pressure-sensing electrode 213, and the pressure sensing film can be deformed due to the electrostatic pull. It may be detected whether the pressure-sensing electrode 213 works normally by detecting whether the electrostatic pull leads to a change in a capacitance of the capacitor including the pressure-sensing electrode 213.

Third Embodiment

FIGS. 12 to FIG. 15 are schematic cross-sectional diagrams of a MEMS pressure sensor in a fabrication process according to an embodiment of the present disclosure.

Figure 12:
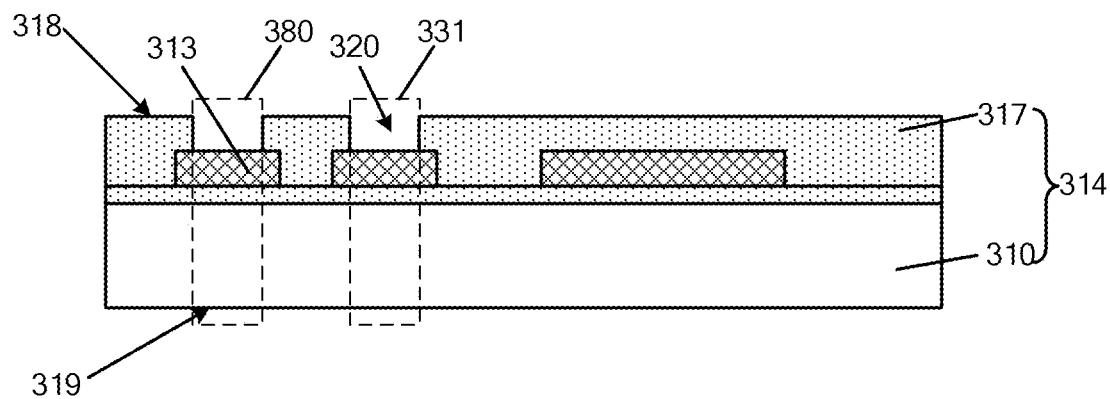
FIGS. 12 to FIG. 15 are schematic cross-sectional diagrams of a MEMS pressure sensor in a fabrication process according to an embodiment of the present disclosure.

Referring to FIG. 12, a second substrate 314 is prepared. The second substrate 314 includes a third surface 318 and a fourth surface 319 opposite to the third surface 318. The second substrate 314 includes a second base 310 and a pressure-sensing electrode 313 arranged on or above the second base 310. The second substrate 314 includes a pressure sensing region 380 and a reference unit region 331. The pressure-sensing electrode 313 is arranged on the side of the third surface 318 of the second substrate 314 and is arranged in the pressure sensing region 380.

A pressure-sensing electrode 313 is further formed in the reference unit region 331.

In the embodiment, the second substrate 314 further includes a second bonding layer 317 arranged on the side of the third surface 318 of the second substrate 314, and the second bonding layer 317 includes first openings 320. The first openings 320 are formed in the pressure sensing region 380 and the reference unit region 331. The first openings 320 are used to form cavities in the pressure sensing region 380 and the reference unit region 331 after the first substrate and the second substrate 314 are bonded.

The second substrate 314 and the pressure-sensing electrode 313 are the same as those described in conjunction with FIGS. 2 to FIG. 5 according to the previous embodiment, which are not described herein.

Figure 13:
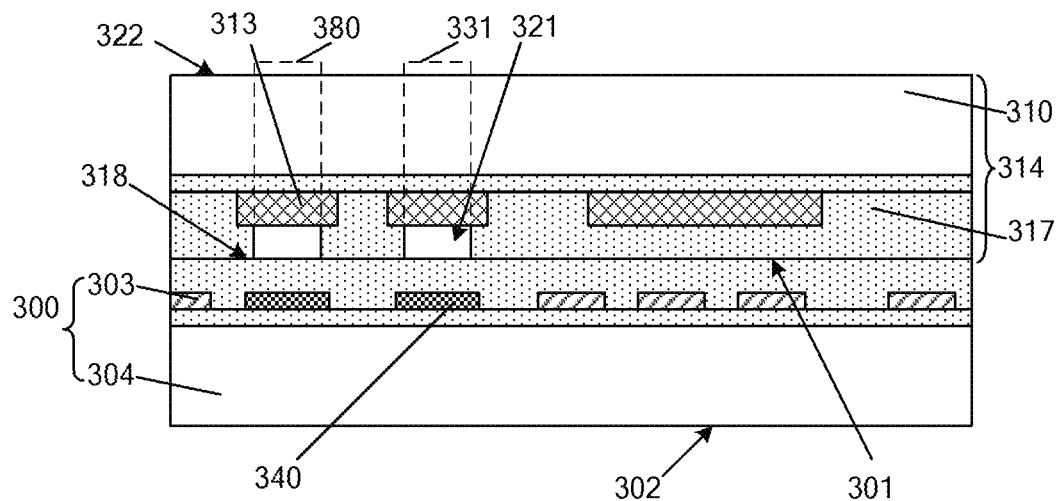

Referring to FIG. 13, a first substrate 300 is prepared. The first substrate 300 includes a first surface 301 and a second surface 302 opposite to the first surface 301. The first substrate 300 includes at least one conductive layer 303 arranged on the side of the first surface 301 of the first substrate 300. The first surface 301 of the first substrate 300 and the third surface 318 of the second substrate 314 are bonded with each other. A cavity 321 is formed between the first substrate 300 and the pressure sensing region 380 of the second substrate 314, and a cavity 321 is formed between the first substrate 300 and the reference unit region 331 of the second substrate 314. A deformation on a portion of the second substrate 314 corresponding to the reference unit region 331 is less than a deformation on a portion of the second substrate 314 corresponding to the pressure sensing region 380, under a same external pressure.

In the embodiment, the first substrate 300 further includes a fixed electrode 340 arranged on the side of the first surface 301 of the first substrate 300. When the first surface 301 of the first substrate 300 and the third surface 318 of the second substrate 314 are bonded with each other, the fixed electrode 340 corresponds to the pressure-sensing electrode 313 and the cavity 321 is formed between the pressure-sensing electrode 313 and the fixed electrode 340.

A first base 304 is the same as that described in conjunction with FIG. 1 according to the previous embodiment, which is not described herein. A step of bonding the first surface 301 of the first substrate 300 and the third surface 318 of the second substrate 314 with each other is the same as the step described in conjunction with FIG. 6 according to the previous embodiment, which is not described herein.

The pressure sensing region 380 of the second substrate 314 and the reference unit region 331 of the second substrate 314 each include the first opening in the second bonding layer 317. In this case, the cavities 321 may be formed in the pressure sensing region 380 and the reference unit region with the first openings and the first surface 301 of the first substrate 300.

Since a cover layer is formed in a later step on a portion of the fifth surface of the second substrate 314 corresponding to the reference unit region 331, a change in a capacitance of a capacitor including the pressure-sensing electrode 313 in the reference unit region 331 due to an external pressure can be avoided or reduced, and the capacitance of the pressure-sensing electrode 313 in the reference unit region 331 may change due to factors other than pressure. An electrical signal generated due to the external pressure can be obtained by subtracting an electrical signal output from the pressure-sensing electrode 313 in the reference unit region 331 from an electrical signal output from the pressure-sensing electrode 313 in the pressure sensing region 380. Therefore, the accuracy of the formed MEMS pressure sensor is improved.

Figure 14:
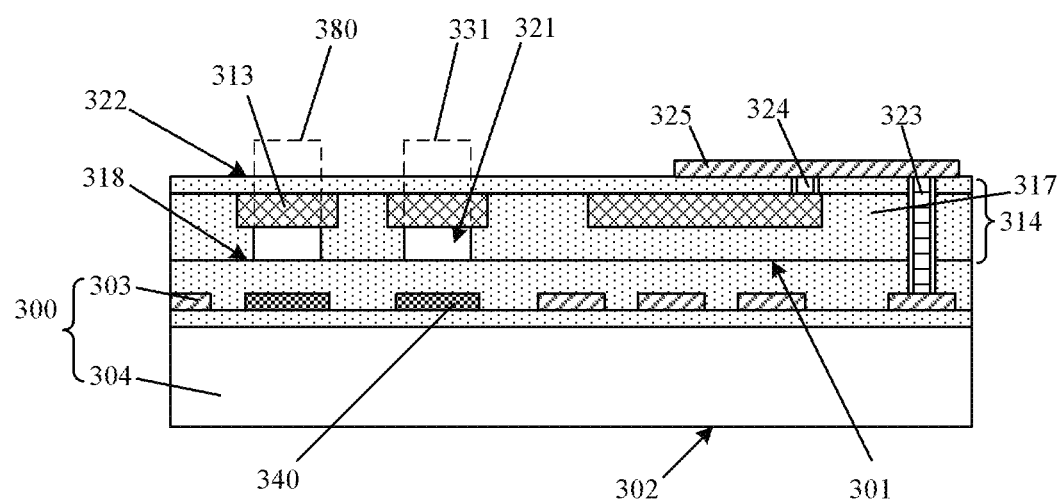

Referring to FIG. 14, the second base 310 (shown in FIG. 13) is removed to form a fifth surface 322 opposite to the third surface 318 of the second substrate 314. A first conductive plug 323 passing through the second substrate 314 from the fifth surface 122 of the second substrate 314 to the at least one conductive layer 303 is formed. The first conductive plug 323 is used to electrically connect the conductive layer 303 to the pressure-sensing electrode 313.

In the embodiment, a first conductive structure includes a third conductive plug 324 and a first conductive layer 325.

A step of removing the second base 310 is the same as the step described in the previous embodiment, which is not described herein. Steps of forming the first conductive plug 323 and the first conductive structure are the same as steps described in the previous embodiment, which are not described herein.

Figure 15:
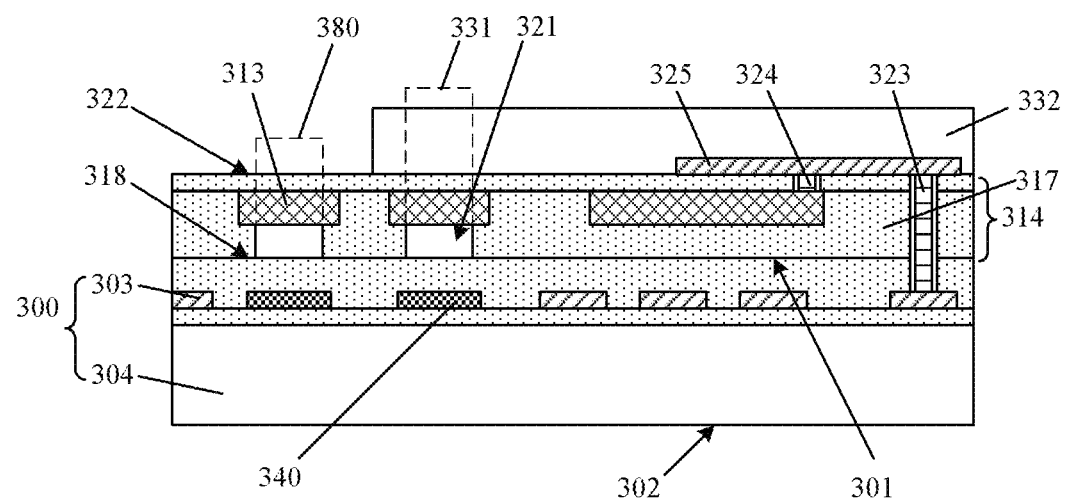

Referring to FIG. 15, a cover layer 332 is formed on a portion of the fifth surface 322 of the second substrate 314 corresponding to the reference unit region 331, after the second base 310 (as shown in FIG. 13) is removed.

The cover layer 331 is comprised of an insulating material. The cover layer 332 can protect the pressure-sensing electrode 313 in the reference unit region 331 from being affected by an external force since the cover layer 331 has a high stiffness.

The forming the cover layer 332 includes: depositing a cover film partially on the fifth surface 322 and partially on a surface of the first conductive structure; forming a patterned layer on a surface of the cover film; and etching the cover film with the patterned layer being a mask until a portion of the fifth surface 322 located in the pressure sensing region 380 is exposed. The cover layer 232 may be comprised of one or more of silicon oxide, silicon nitride, silicon oxynitride, amorphous carbon, polycrystalline silicon, amorphous silicon, polycrystalline germanium and amorphous germanium. The cover film may be formed by a chemical vapor deposition process, a physical vapor deposition process or an atomic layer deposition process. The cover film may be etched by an anisotropic dry etching process.

Since the cover layer 332 is formed on a portion of the fifth surface 322 of the second substrate 314 corresponding to the reference unit region 331, the capacitance of the pressure-sensing electrode 313 in the reference unit region 331 may show less or no change in response to an external pressure, but it may change due to factors other than pressure. An electrical signal generated due to the external pressure can be obtained by subtracting the electrical signal output by the pressure-sensing electrode 313 in the reference unit region 331 from the electrical signal output by the pressure-sensing electrode 313 in the pressure sensing region 380.

Accordingly, the embodiment of the present disclosure further provides a MEMS pressure sensor formed with the above method. Reference is still made to FIG. 15, the MEMS pressure sensor includes a first substrate 300 and the second substrate 314. The first substrate 300 includes a first surface 301 and a second surface 302 opposite to the first surface 301. The first substrate 300 includes at least one conductive layer 30 arranged on the side of the first surface 301 of the first substrate 300. The second substrate 314 includes a third surface 318 and a fifth surface 322 opposite to the third surface 318. The second substrate 314 includes a pressure-sensing electrode 313. The second substrate 314 includes a pressure sensing region 380 and a reference unit region 331. The pressure-sensing electrodes 313 are arranged in the pressure sensing region 380 and the reference unit region 331. The first surface 301 of the first substrate 300 and the third surface 318 of the second substrate 314 are bonded with each other. A cavity 321 is formed between the first substrate 300 and the pressure sensing region 380 of the second substrate 314, and a cavity 321 is formed between the first substrate 300 and the reference unit region 331 of the second substrate 314. A first conductive plug 323 passing through the second substrate 314 from the fifth surface 322 of the second substrate 314 to the at least one conductive layer 303 is formed, and a first conductive structure electrically connected to the first conductive plug 323 and the pressure-sensing electrodes 313 is formed. The first conductive plug 323 is used to electrically connect the conductive layer 303 to the pressure-sensing electrode 313.

In the embodiment, the first substrate 300 further includes a fixed electrode 340 arranged on the side of the first surface 301 of the first substrate 300. The fixed electrode 340 corresponds to the pressure-sensing electrode 313 and the cavity 321 is formed between the pressure-sensing electrode 313 and the fixed electrode 340.

The cover layer 332 may be comprised of one or more of silicon oxide, silicon nitride, silicon oxynitride, amorphous carbon, polycrystalline silicon, amorphous silicon, polycrystalline germanium and amorphous germanium.

The first substrate 300, the second substrate 314, the pressure-sensing electrode 313, the fixed electrode 340, the conductive layer 303, the first conductive plug 323 and the first conductive structure are the same as those described in conjunction with FIG. 9 according to the previous embodiment, which are not described herein.

Fourth Embodiment

Figure 16:
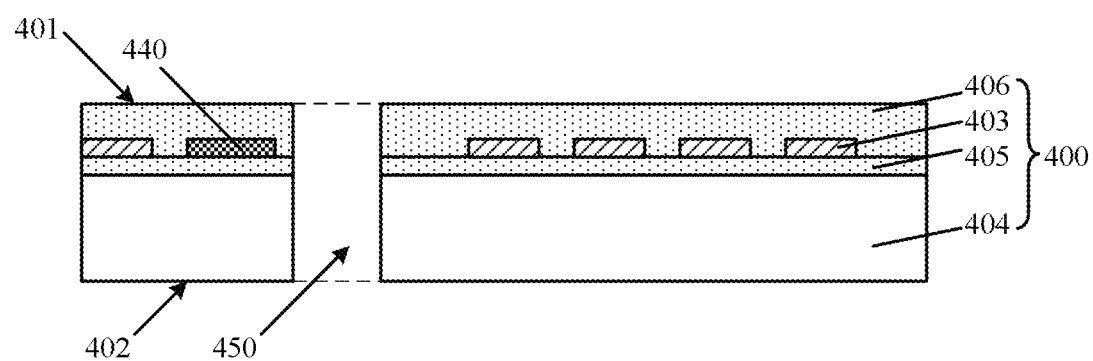
FIGS. 16 to FIG. 17 are schematic cross-sectional diagrams of a MEMS pressure sensor in a fabrication process according to an embodiment of the present disclosure.
Figure 17:
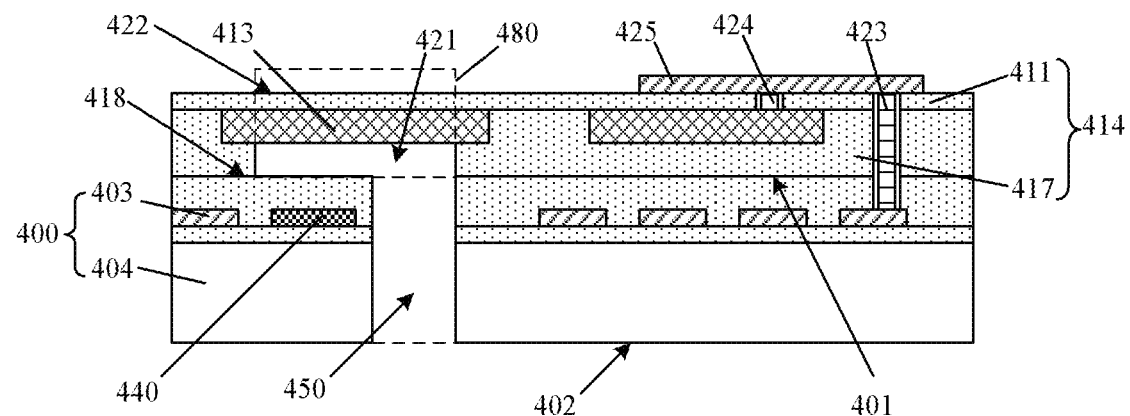

FIGS. 16 to FIG. 17 are schematic cross-sectional diagram of a MEMS pressure sensor in a fabrication process according to an embodiment of the present disclosure.

Referring to FIG. 16, a first substrate 400 is prepared. The first substrate 400 includes a first surface 401 and a second surface 402 opposite to the first surface 401. The first substrate 400 includes a first base 404, and at least one conductive layer 403 arranged on the side of the first surface 401 of the first substrate 400. A second opening 450 in the first substrate 400 is formed.

In the embodiment, the first substrate 400 further includes a fixed electrode 440 arranged on the side of first surface 401 of the first substrate 400.

The forming the second opening 450 includes: forming a patterned layer on the second surface 402 of the first substrate 400, with a location where the second opening is to be formed being exposed from the patterned layer; etching the first substrate 400 with the patterned layer being a mask until the first substrate 400 is passed through, to form a second opening 450. The patterned layer is a patterned photoresist layer, and the etching process includes an anisotropic dry etching process.

The first substrate 400, and the first base 404 and the conductive layer 403 of the first substrate 400 are the same as those described in conjunction with FIG. 1 according to the previous embodiment, which are not described herein.

Referring to FIG. 17, a second substrate 414 is prepared. The second substrate 414 includes a third surface 418 and a fourth surface opposite to the third surface 418. The second substrate 414 includes a second base and a pressure-sensing electrode 413 arranged on or above the second base. The second substrate 414 includes a pressure sensing region 480 in which the pressure-sensing electrode 413 is arranged. The pressure-sensing electrode 413 is arranged on the side of the third surface 418 of the second substrate 414. The first surface 401 of the first substrate 400 and the third surface 418 of the second substrate 414 are bonded with each other, and a cavity 421 between the first substrate 400 and the pressure sensing region 480 of the second substrate 414. The second base is removed to form a fifth surface 422 opposite to the third surface 418 of the second substrate 414. A first conductive plug 423 passing through the second substrate 414 from the side of the fifth surface 422 of the second substrate 414 to the at least one conductive layer 403 is formed, and the first conductive plug 423 is used to electrically connect the conductive layer 403 to the pressure-sensing electrode 418.

When the first surface 401 of the first substrate 400 and the third surface 418 of the second substrate 414 are bonded with each other, the fixed electrode 440 corresponds to the pressure-sensing electrode 413, and the cavity is formed between the pressure-sensing electrode 413 and the fixed electrode 440.

In the embodiment, a first conductive structure electrically connected to the first conductive plug 423 and the pressure-sensing electrode 413 is formed. The first conductive structure includes a third conductive plug 424 and a first conductive layer 425.

Material, structures and fabrication steps and fabrication processes of the second substrate 414 are the same as those described in conjunction with FIGS. 2 to FIG. 5 according to the previous embodiment; a step of bonding the first substrate 400 and the second substrate 414 with each other is the same as that described in conjunction with FIG. 6 according to the previous embodiment; a step of removing the second base is the same as that described in conjunction with FIG. 7 according to the previous embodiment; and steps of forming the first conductive plug 423 and the first conductive structure are the same as those described in the previous embodiment; which are not described herein.

After the first surface 401 of the first substrate 400 and the third surface 418 of the second substrate 414 are bonded with each other, a location of the second opening 450 corresponds to a location of the pressure sensing region 480 of the second substrate. Therefore, the second opening 450 is in communication with the cavity 421, and two sides of the pressure sensing film are exposed to the external environment.

Since the second opening 450 is exposed to the external environment, pressures from the external environment are obtained on both sides of the pressure sensing film. In a case that the pressures on the two sides of the pressure sensing film are different, the pressure sensing film is deformed and a capacitance of the pressure-sensing electrode 413 changes. Therefore, the pressure-sensing electrode 413 according to the embodiment can acquire a differential pressure signal for the two sides, and the formed MEMS pressure sensor may serve as a differential pressure sensor.

Accordingly, the embodiment of the present disclosure further provides a MEMS pressure sensor formed with the above method. Reference is still made to FIG. 17. The MEMS pressure sensor includes a first substrate 400 and a second substrate 414. The first substrate 400 includes a first surface 401 and a second surface 402 opposite to the first surface 401. The first substrate 400 includes at least one conductive layer 403 arranged on the side of the first surface 401 of the first substrate 400. The second substrate 414 includes a third surface 418 and a fifth surface 422 opposite to the third surface 418. The second substrate 414 includes a pressure-sensing electrode 413. The second substrate 414 includes a pressure sensing region 480 in which the pressure-sensing electrode is arranged. The first surface 401 of the first substrate 400 and the third surface 418 of the second substrate 414 are bonded with each other and a cavity 421 is formed between the first substrate 400 and the pressure sensing region 480 of the second substrate 414. A first conductive plug 423 passing through the second substrate 414 from the fifth surface 422 of the second substrate 414 to a surface of the at least one conductive layer 403 is formed, and the first conductive plug 423 is used to electrically connect the conductive layer 403 to the pressure-sensing electrode 413.

In the embodiment, the first substrate 400 further includes a fixed electrode 440 arranged on the side of the first surface 404 of the first substrate 400. The fixed electrode 440 corresponds to the pressure-sensing electrode 413 and the cavity 421 is formed between the pressure-sensing electrode 413 and the fixed electrode 440.

In the embodiment, the MEMS pressure sensor further includes a first conductive structure electrically connected to the first conductive plug 423 and the pressure-sensing electrode 413, and a second opening 450 passing through the first substrate 400. A location of the second opening 450 corresponds to a location of the pressure sensing region 480 of the second substrate 414.

Fifth Embodiment

Figure 18:
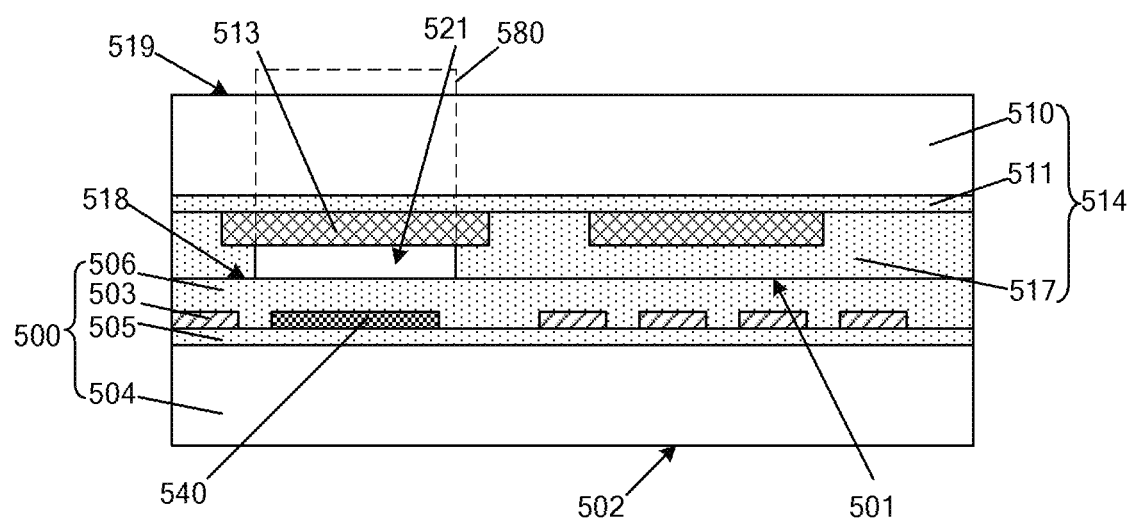
FIGS. 18 to FIG. 20 are schematic cross-sectional diagrams of a MEMS pressure sensor in a fabrication process according to an embodiment of the present disclosure.
Figure 19:
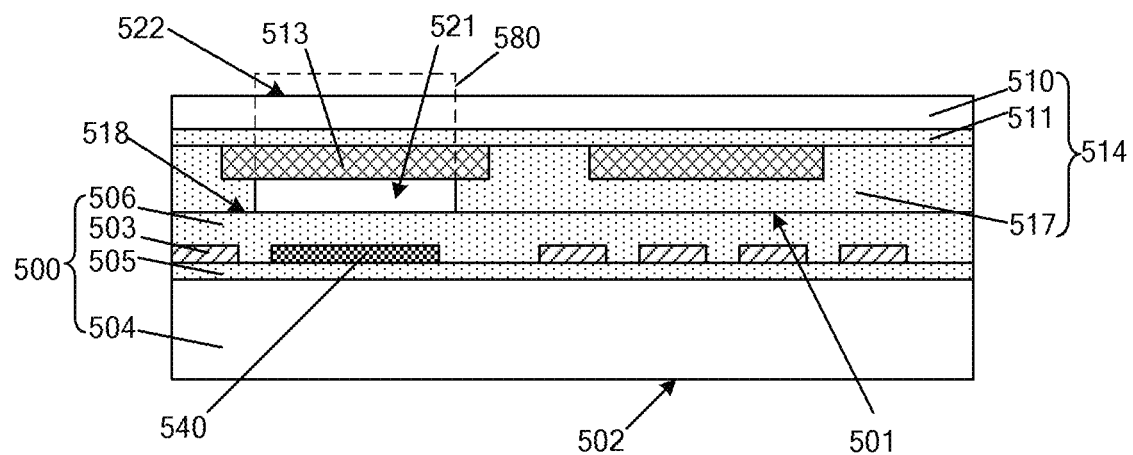
Figure 20:
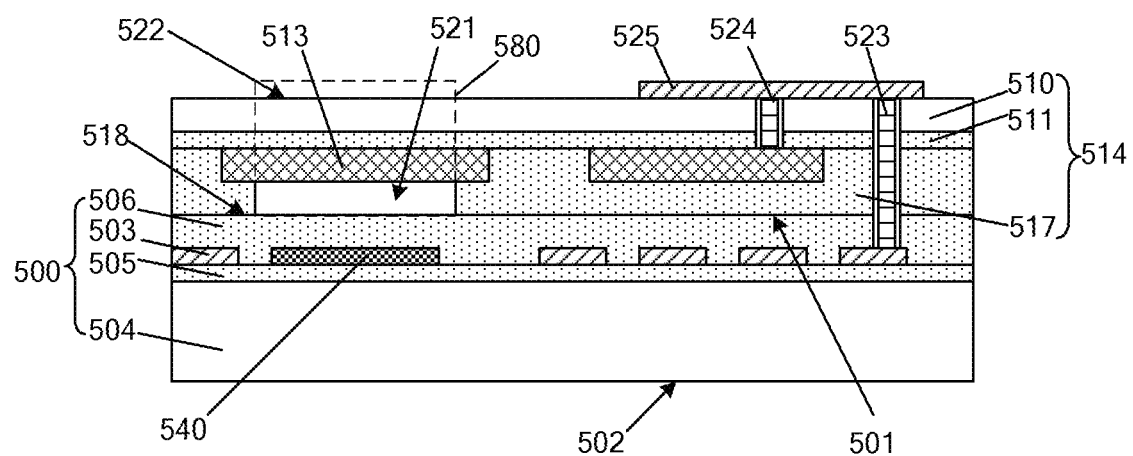

FIGS. 18 to FIG. 20 are schematic cross-sectional diagrams of a MEMS pressure sensor in a fabrication process according to an embodiment of the present disclosure.

Referring to FIG. 18, a first substrate 500 and a second substrate 514 are prepared. The first substrate 500 includes a first surface 501 and a second surface 502 opposite to the first surface 501. The first substrate 500 includes at least one conductive layer 503 arranged on the side of the first surface 501 of the first substrate 500. The second substrate 514 includes a third surface 518 and a fourth surface 519 opposite to the third surface 518. The second substrate 514 includes a second base 510 and a pressure-sensing electrode 513 arranged on or above the second base 510. The second substrate 514 includes a pressure sensing region 580 in which the pressure-sensing electrode 513 is arranged. The pressure-sensing electrode is arranged on the side of the third surface 518 of the second substrate 514. The first surface 501 of the first substrate 500 and the third surface 518 of the second substrate 514 are bonded with each other and a cavity 521 is formed between the first substrate 500 and the pressure sensing region 580 of the second substrate 514.

In the embodiment, the first substrate 500 further includes a fixed electrode 540 arranged on the side of the first surface 501 of the first substrate 500. When the first surface 501 of the first substrate 500 and the third surface 518 of the second substrate 514 are bonded with each other, the fixed electrode 540 corresponds to the pressure-sensing electrode 513 and the cavity 521 is formed between the pressure-sensing electrode 513 and the fixed electrode 514.

In another embodiment, the second substrate further includes a fixed electrode corresponding to the pressure-sensing electrode, and the cavity is formed between the pressure-sensing electrode and the fixed electrode.

In the embodiment, the first substrate 500 includes a first bonding layer 506 arranged on the side of the first surface 501.

In an embodiment, the first substrate 500 further includes a self-test electrode. A location of the self-test electrode corresponds to a location of the pressure sensing region 580 of the second substrate 514 after the first surface 501 of the first substrate 500 and the third surface 518 of the second substrate 514 are bonded with each other.

The second substrate 514 further includes a protective layer 511 arranged on a surface of the second base 510, and the pressure-sensing electrode 513 is arranged on a surface of the protective layer 511. In an embodiment, the forming the second substrate 514 includes: preparing a semiconductor-on-insulator substrate, which includes a base, a insulating layer arranged on a surface of the base and a semiconductor layer arranged on a surface of the insulating layer; forming a first patterned layer on a surface of the semiconductor layer, with a portion of the surface of the semiconductor layer be exposed from the first patterned layer; etching the semiconductor layer with the first patterned layer being a mask to form a pressure-sensing electrode 513, where the base is the second base 510 and the insulating layer is the protective layer 511; and removing the first patterned layer after the semiconductor layer is etched. An electrode interconnection layer may be formed by etching the semiconductor layer, and the electrode interconnection layer is electrically connected to the pressure-sensing electrode 513. In another embodiment, the second base 510 may be a body base.

The second substrate 514 further includes a second bonding layer 517 arranged on the side of the third surface 518. In an embodiment, at least one of the first bonding layer 506 and the second bonding layer 517 may be comprised of an insulating material.

In an embodiment, the first surface 501 of the first substrate 500 and the third surface 518 of the second substrate 514 are bonded with each other by a direct-bonding process. In another embodiment, the first surface 501 of the first substrate 500 and the third surface 518 of the second substrate 514 are bonded with each other by an adhesive bonding process. The first bonding layer 506 or the second bonding layer 517 is an adhesive bonding layer which may be comprised of an insulating material, a semiconductor material, a metal material or an organic material.

In an embodiment, the second substrate 514 further includes a sensing unit region and a reference unit region, and the cavities 521 are formed in the sensing unit region and the reference unit region.

In an embodiment, the forming the cavity 521 includes: forming a first opening from the third surface 518 of the second substrate 514 before the first surface 501 of the first substrate 500 and the third surface 518 of the second substrate 514 are bonded with each other, with a location of the first opening corresponding to a location of the pressure sensing region 580 of the second substrate 514; and forming a cavity 521 with the first opening and the first surface 501 of the first substrate 500 after the first surface 501 of the first substrate 500 and the third surface 518 of the second substrate 514 are bonded with each other.

In an embodiment, a second opening passing through the first substrate 500 is formed. A location of the second opening corresponds to a location of the pressure sensing region 580 of the second substrate 514 after the first surface 501 of the first substrate 500 and the third surface 518 of the second substrate 514 are bonded with each other.

In the embodiment, the first substrate 500, the second substrate 514 and a step of bonding the first substrate 500 and the second substrate 514 with each other are the same as those described in conjunction with FIGS. 1 to FIG. 6 according to the previous embodiments, which are not described herein.

Referring to FIG. 19, the second substrate 514 is thinned from the fourth surface 519 (shown in FIG. 18) by partially removing the second base 510, to form a fifth surface 522 opposite to the third surface 518 of the second substrate 514.

The second base 510 may be thinned from the fourth surface 519 by a chemical mechanical polishing process. In the embodiment, the fourth surface 519 of the second substrate 514 is a surface of the second base 510, and hence the second base 510 is thinned by the chemical mechanical polishing process. The pressure-sensing electrode 513 and the protective layer 511 are protected by a portion of the second base 510 not being thinned and located on a surface of the protective layer 511, after the second base 510 is thinned.

In an embodiment, the second substrate 514 further includes a sensing unit region and a reference unit region, cavities 521 are formed in the sensing unit region and the reference unit region, and a cover layer is formed on a portion of the fifth surface 522 of the second substrate 514 corresponding to the reference unit region after the second base 510 is thinned.

Referring to FIG. 20, a first conductive plug 523 passing through the second substrate 514 from the side of the fifth surface 522 of the second substrate 514 to the at least one conductive layer 503 is formed, and the first conductive plug 523 is used to electrically connect the conductive layer 503 to the pressure-sensing electrode 513.

The first conductive plug 523 electrically connects the conductive layer 503 to the pressure-sensing electrode 513 via a first conductive structure. The first conductive structure includes a third conductive plug 524 passing through the second substrate 514 from the fifth surface 522 of the second substrate 514 to an electrode interconnection layer, and a first conductive layer 525 arranged partially on the fifth surface 522 of the second substrate and partially on top surfaces of the first conductive plug 523 and the third conductive plug 524. An insulating layer may further be formed between the first conductive layer 525 and the second base 510.

Material, structures and fabrication steps of the first conductive structure and the first conductive plug 523 are the same as those described in conjunction with FIGS. 8 and FIG. 9 according to the previous embodiment, which are not described herein.

Accordingly, the embodiment of the present disclosure further provides a MEMS pressure sensor formed with the above method. Reference is still made to FIG. 20. The MEMS pressure sensor includes a first substrate 500 and a second substrate 514. The first substrate 500 includes a first surface 501 and a second surface 502 opposite to the first surface 501. The first substrate 500 includes at least one conductive layer 503 close to the first surface 501 of the first substrate 500. The second substrate 514 includes a third surface 518 and a fifth surface 522 opposite to the third surface 518. The second substrate 514 includes a second base 510 and a pressure-sensing electrode 513 arranged on or above the second base 510. The second substrate 514 includes a pressure sensing region 580 in which the pressure-sensing electrode 513 is arranged. The pressure-sensing electrode 513 is arranged on the side of the third surface 518 of the second substrate 514. The first surface 501 of the first substrate 500 and the third surface 518 of the second substrate 514 are bonded with each other, and a cavity 521 is formed between the first substrate 500 and the pressure sensing region 580 of the second substrate 514. A first conductive plug 523 passing through the second substrate 514 from the side of the fifth surface 522 of the second substrate 514 to the at least one conductive layer 503 is formed, and the first conductive plug 523 is used to electrically connect the conductive layer 503 to the pressure-sensing electrode 513.

In the following, the above structure is described in detail.

In the embodiment, the first substrate 500 further includes a fixed electrode 540 arranged on the side of the first surface 501 of the first substrate 500, the fixed electrode 540 corresponds to the pressure-sensing electrode 513, and the cavity 521 is formed between the pressure-sensing electrode 513 and the fixed electrode 540.

In another embodiment, the second substrate further includes a fixed electrode corresponding to the pressure-sensing electrode, and the cavity is formed between the pressure-sensing electrode and the fixed electrode.

The second substrate 514 further includes a protective layer 511 arranged on a surface of the pressure-sensing electrode 513, and a surface of the protective layer 511 is the fifth surface 522.

The first conductive plug 523 is electrically connected to the conductive layer 503 and the pressure-sensing electrode 513 via a first conductive structure. The first conductive structure includes a third conductive plug 524 passing through the second substrate 514 from the fifth surface 522 of the second substrate 514 to the electrode interconnection layer, and a first conductive layer 525 arranged on the fifth surface 522 of the second substrate 514. The first conductive layer is also arranged on top surfaces of the first conductive plug 523 and the third conductive plug 524.

The second substrate 514 further includes a second bonding layer 517 arranged on the side of the third surface 518. Alternatively, the first substrate 500 includes a first bonding layer 506 arranged on the side of the first surface 501. Alternatively, the second substrate 514 further includes a second bonding layer 517 arranged on the side of the third surface 518 and the first substrate 500 includes a first bonding layer 506 arranged on the side of the first surface 501.

In an embodiment, at least one of the first bonding layer 506 and the second bonding layer 517 may be comprised of an insulating material.

In an embodiment, the first substrate 500 further includes a circuit.

In an embodiment, the first bonding layer 506 or the second bonding layer 507 is an adhesive bonding layer which may be comprised of an insulating material, a semiconductor material, a metal material or an organic material.

In another embodiment, the first bonding layer 506 is a bonding layer; or the second bonding layer 517 is a bonding layer; or the first bonding layer 506 and the second bonding layer 517 are bonding layers.

Sixth Embodiment

Figure 21:
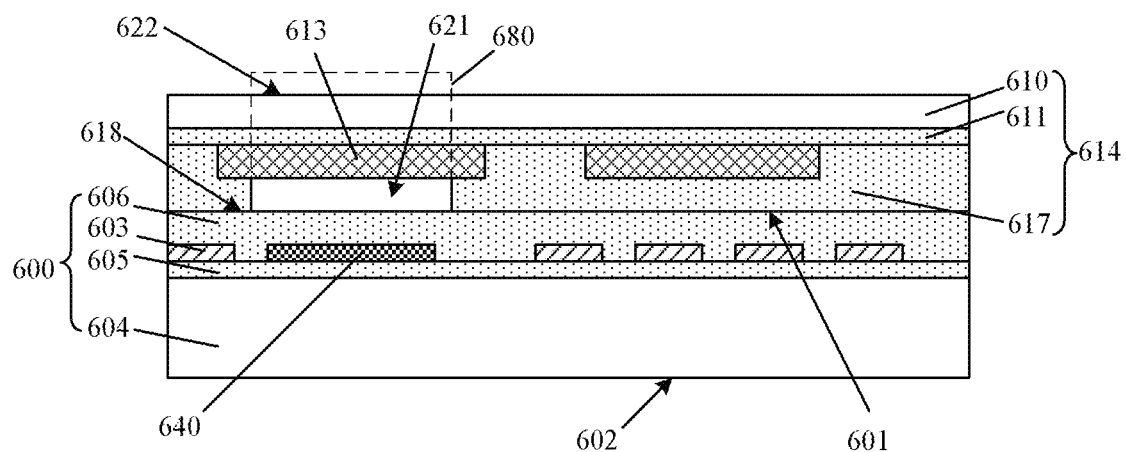
FIGS. 21 to FIG. 23 are schematic cross-sectional diagrams of a MEMS pressure sensor in a fabrication process according to an embodiment of the present disclosure.
Figure 22:
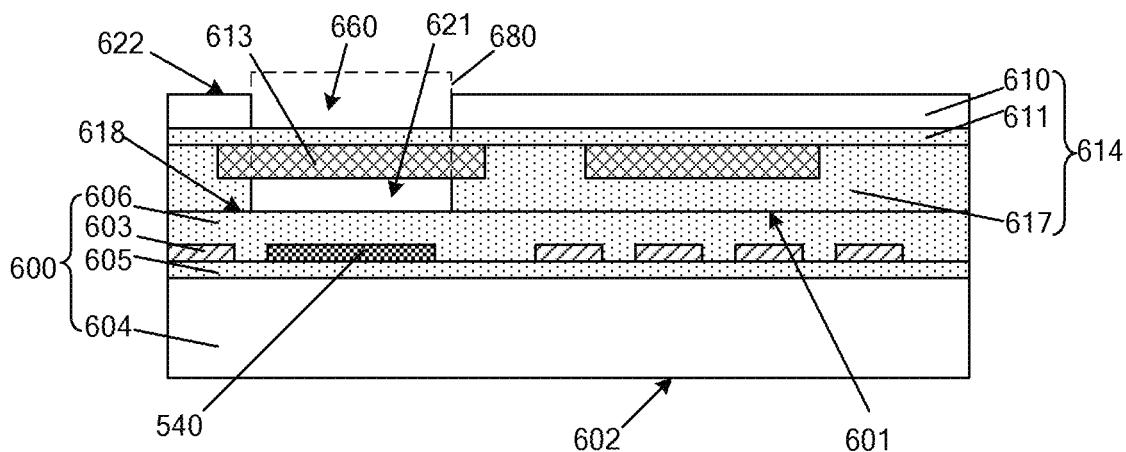
Figure 23:
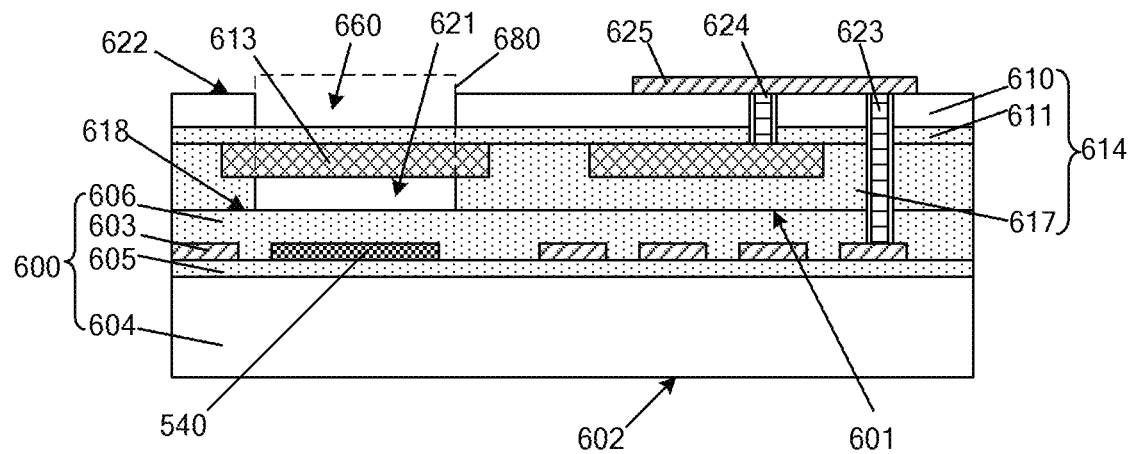

FIGS. 21 to FIG. 23 are schematic cross-sectional diagrams of a MEMS pressure sensor in a fabrication process according to an embodiment of the present disclosure.

Referring to FIG. 21, a first substrate 600 and a second substrate 614 are prepared. The first substrate 600 includes a first surface 601 and a second surface 602 opposite to the first surface 601. The first substrate 600 includes a first base 604, and at least one conductive layer 603 arranged on the side of the first surface 601 of the first substrate 600. The second substrate 614 includes a third surface 618 and a fourth surface opposite to the third surface 618. The second substrate 614 includes a second base 610 and a pressure-sensing electrode 613 arranged on or above the second base 610. The second substrate 614 includes a pressure sensing region 680 in which the pressure-sensing electrode 613 is arranged. The pressure-sensing electrode 613 is arranged on the side of the third surface 618 of the second substrate 614. The first surface 601 of the first substrate 600 and the third surface 618 of the second substrate 614 are bonded with each other and a cavity 621 is formed between the first substrate 600 and the pressure sensing region 680 of the second substrate 614. The second substrate 614 is thinned from the fourth surface by partially removing the second base 610, to form a fifth surface 622 opposite to the third surface 618 of the second substrate 614.

In the embodiment, the first substrate 600 further includes a fixed electrode 640 arranged on the side of the first surface 601 of the first substrate 600. When the first surface 601 of the first substrate 600 and the third surface 618 of the second substrate 614 are bonded with each other, the fixed electrode 640 corresponds to the pressure-sensing electrode 513 and the cavity is formed between the pressure-sensing electrode 613 and the fixed electrode 640.

In another embodiment, the second substrate further includes a fixed electrode corresponding to the pressure-sensing electrode, and the cavity is formed between the pressure-sensing electrode and the fixed electrode.

The second substrate 614 further includes a second bonding layer 617 on the side of the third surface 618. A step of bonding the first surface 601 of the first substrate 600 and the third surface 618 of the second substrate 614 with each other and a step of thinning the second substrate 614 from the fourth surface are the same as those described in conjunction with FIGS. 18 and FIG. 19 according to the previous embodiment, which are not described herein.

Referring to FIG. 22, a third opening 660 is formed in the second substrate 614 after the second substrate 614 is thinned from the fourth surface, and a location of the third opening 660 corresponds to a location of the pressure sensing region 680 of the second substrate 614.

The second opening 660 may pass through the second base 610, or may not pass through the second base 610.

In an embodiment, a third opening formed in the second substrate does not pass through the second base. Alternatively, at least one fifth through hole passing through the second base is formed on the side of the fifth surface of the second substrate, and a location of the fifth through hole corresponds to the pressure sensing region.

The second base having the fifth through hole may filter out dust in the air and may be used for an electric shielding. In addition, the second base located in the pressure sensing region may serve as a self-test electrode. In a case that a bias voltage is applied to the second base, the second base may generate an electrostatic pull on the pressure-sensing electrode to detect whether the pressure-sensing resistor works normally.

The forming the third opening 660 includes: forming a patterned layer on the fifth surface 622 of the second substrate 614, with a location where a third opening 660 is to be formed being exposed from the patterned layer; and etching the fifth surface 622 of the second substrate 614 with the patterned layer being a mask, to form a third opening 660. The patterned layer is a patterned photoresist layer. The etching process includes an anisotropic dry etching process. In the embodiment, the protective layer 611 is exposed through the third opening 660.

Since a region other than the pressure sensing region 680 is covered by the second base 610, a distance from the pressure-sensing electrode 613 to the external environment is lengthened without affecting an accuracy of detecting an external pressure by the pressure-sensing electrode 613. In this case, the pressure-sensing electrode 613 is protected, and a pressure sensing film and a protective layer 611 on the surface of the pressure sensing film is prevented from wears or other damages.

In an embodiment, the second substrate 614 further includes a sensing unit region and a reference unit region, and the cavity 621 is formed in the sensing unit and the reference unit region. In this case, only a portion of a surface of the protective layer 611 corresponding to the sensing unit region is exposed through the third opening, and a portion of the surface region of the protective layer 611 corresponding to the reference unit region is still covered by the second base 610. Therefore, no additional cover layer is necessary on or above the second base 610 for increasing the stiffness, and the second base 610 may serve as a cover layer on a surface of a pressure sensing region 612 located in the reference unit region.

Referring to FIG. 23, a first conductive plug 623 passing through the second substrate 614 from the side of the fifth surface 622 of the second substrate 614 to a surface of the at least one conductive layer 603 is formed, and the first conductive plug 623 is used to electrically connect the conductive layer 603 to the pressure-sensing electrode 613.

Material, structures and forming steps of a first conductive structure and the first conductive plug 623 are the same as those described in conjunction with FIGS. 8 and 9 according to the previous embodiment, which are not described herein.

Accordingly, the embodiment of the present disclosure further provides a MEMS pressure sensor formed with the above method. Reference is still made to FIG. 23. The MEMS pressure sensor includes a first substrate 600 and a second substrate 614. The first substrate 600 includes a first surface 601 and a second surface 602 opposite to the first surface 601. The first substrate 600 includes a circuit 603 close to the first surface 601 of the first substrate 600. The second substrate 614 includes a third surface 618 and a fifth surface 622 opposite to the third surface 618. The second substrate 614 includes a second base 610 and a pressure-sensing electrode 613 arranged on or above the second base 610, and the pressure-sensing electrode 613 is arranged on the side of the third surface 618 of the second substrate 614. The second substrate 614 includes a third opening 660, and a location of the third opening 660 corresponds to a location of the pressure-sensing electrode 613. The first surface 601 of the first substrate 600 and the third surface 618 of the second substrate 614 are bonded with each other, and a cavity 621 is formed between the first substrate 600 and the second substrate 614. A first conductive plug 623 passing through the second substrate 614 from the fifth surface 622 of the second substrate 614 to the surface of the circuit 603 is formed. A first conductive structure, which is electrically connected to the pressure-sensing electrode 613 and the first conductive plug 623, is formed.

Seventh Embodiment

Figure 24:
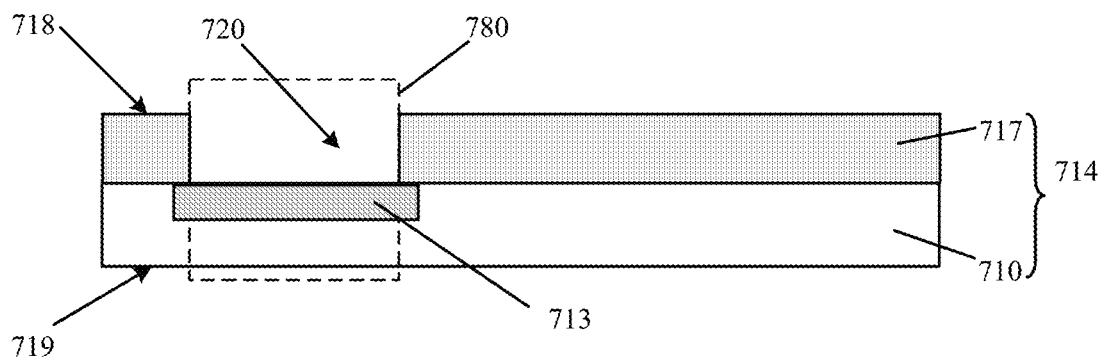
FIGS. 24 to FIG. 26 are schematic cross-sectional diagrams of a MEMS pressure sensor in a fabrication process according to an embodiment of the present disclosure.
Figure 25:
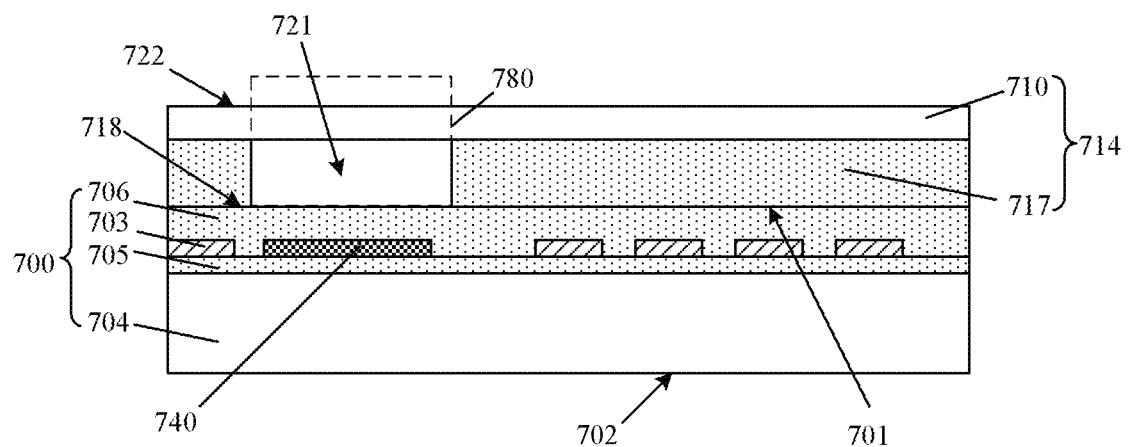
Figure 26:
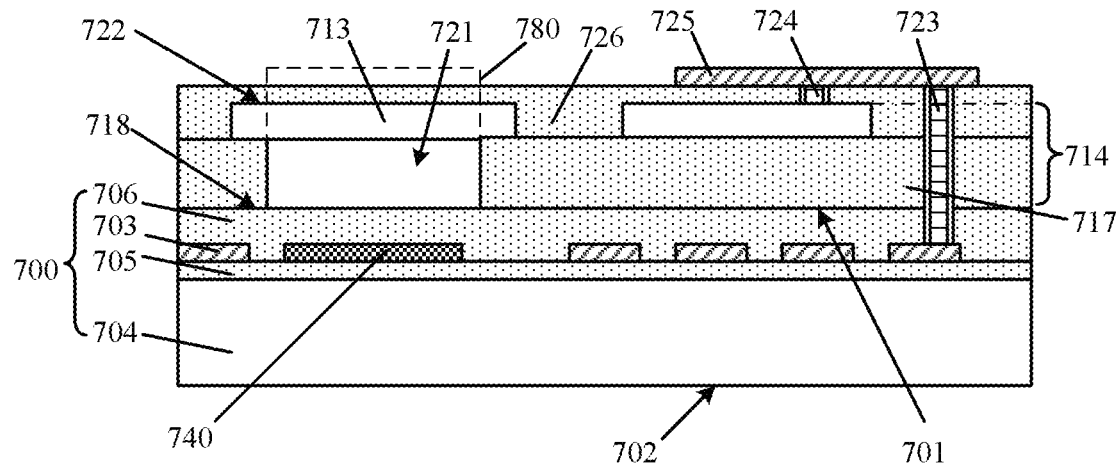

FIGS. 24 to FIG. 26 are schematic cross-sectional diagrams of a MEMS pressure sensor in a fabrication process according to an embodiment of the present disclosure.

Referring to FIG. 24, a second substrate 714 is prepared. The second substrate 714 includes a third surface 718 and a fourth surface 719 opposite to the third surface 718. The second substrate 714 includes a second base 710 and a pressure-sensing electrode 713 arranged in the second base 710. The second substrate 714 includes a pressure sensing region 780 in which the pressure-sensing electrode 713 is arranged. The pressure-sensing electrode is arranged on the side of the third surface 718 of the second substrate 714.

In the embodiment, the pressure-sensing electrode is formed by the second base 710 which is a body base. A second bonding layer 717 is arranged on a surface of the second base 710. The pressure-sensing electrode is formed on a side of the second base 710 in the pressure sensing region 780 close to the third surface 718. Material, structures and fabrication processes of the second bonding layer 717 are the same as those described in the previous embodiments, which are not described herein.

In the embodiment, a first opening 720 is formed on the side of the third surface 718 of the second substrate 714, and a location of the first opening 720 corresponds to a location of the pressure sensing region 780.

In an embodiment, the second substrate 714 further includes a sensing unit region and a reference unit region, and the pressure-sensing electrode is formed in the sensing unit and the reference unit region.

Referring to FIG. 25, a first substrate 700 is prepared. The first substrate 700 includes a first surface 701 and a second surface 702 opposite to the first surface 701. The first substrate 701 includes at least one conductive layer 703 arranged on the side of the first surface 701 of the first substrate 700. The first surface 701 of the first substrate 700 and the third surface 718 of the second substrate 714 are bonded with each other, and a cavity 721 is formed between the first substrate 700 and the pressure sensing region 780 of the second substrate 714. The second substrate 714 is thinned from the fourth surface 719 of the second substrate 714 by partially removing the second base 710, to form the fifth surface 722 opposite to the third surface 718 of the second substrate 714.

In the embodiment, the first substrate 700 is the same as those described according to the previous embodiment; a step of bonding the first substrate 700 and the second substrate 714, and a step of thinning the second substrate 714 from the fourth surface 719 are the same as those described in conjunction with FIGS. 18 and FIG. 19 according to the previous embodiment, which are not described herein.

The first substrate 700 further includes a circuit including a semiconductor component structure and an electrical interconnection structure. The conductive layer 703 may be a conductive layer of the circuit, or may be a conductive layer added to the circuit. The conductive layer 703 may include a conductor or a semiconductor.

In the embodiment, the first substrate 700 further includes a fixed electrode 740 arranged on the side of the first surface 701 of the first substrate 700, and a location of the first substrate 700 corresponds to a location of the pressure sensing region 780 of the second substrate 714.

In the embodiment, the first substrate 700 includes a first bonding layer 706 on the side of the first surface 701. In an embodiment, at least one of the first bonding layer 706 and the second bonding layer 717 may be comprised of an insulating material.

In an embodiment, the first surface 701 of the first substrate 700 and the third surface 718 of the second substrate 714 may be bonded with each other by a direct-bonding process. In another embodiment, the first surface 701 of the first substrate 700 and the third surface 718 of the second substrate 714 may be bonded with each other by an adhesive bonding process. The first bonding layer 706 or the second bonding layer 717 is an adhesive bonding layer, which may be comprised of an insulating material, a semiconductor material, a metal material or an organic material.

In the embodiment, when the first substrate 700 and the second substrate 714 are bonded with each other, a cavity 721 may be formed with the first substrate 700 and the first opening 720 located on the side of the third surface 718 of the second substrate 714, and the cavity 721 is arranged between the pressure-sensing electrode 713 and the fixed electrode 740.

Referring to FIG. 26, after the second substrate 714 is thinned from the fourth surface 719 of the second substrate 714, the second base 710 (as shown in FIG. 25) is etched to form a pressure-sensing electrode 713. A first conductive plug 723 passing through the second substrate 714 from the side of the fifth surface 722 of the second substrate 714 to the at least one conductive layer 703 is formed, and the first conductive plug 723 is used to electrically connect the conductive layer 703 to the pressure-sensing electrode 713.

A location of the pressure-sensing electrode 713 corresponds to a location of the pressure sensing region 780. In the embodiment, an electrode interconnection layer is formed by etching the second base 710 while the pressure-sensing electrode 713 is formed. The electrode interconnection layer is electrically connected to the pressure-sensing electrode 713.

In the embodiment, after the cavity 721 is formed, a third dielectric layer 726 is formed partially on a surface of the second bonding layer 717 and partially on a surface of the pressure-sensing electrode 713. The first conductive plug 723 passes through the third dielectric layer, the second bonding layer 717 and the first bonding layer 706 until it is connected to the at least one conductive layer 703.

In the embodiment, a third conductive plug 724 is formed in the third dielectric layer 726 and is electrically connected to the electrode interconnection layer. A first conductive layer 725 is formed partially on a surface of the third dielectric layer 726, partially on a surface of the third conductive plug 724 and partially on a surface of the first conductive plug 723. A first conductive structure is formed with the third conductive plug 724 and the first conductive layer 725. The first conductive plug 723 is electrically connected to the pressure-sensing electrode 713 through the first conductive structure.

Material, structures and forming steps of the first conductive structure and the first conductive plug 723 are the same as those described in conjunction with FIGS. 8 and FIG. 9 according to the previous embodiment, which are not described herein.

Eighth Embodiment

Figure 27:
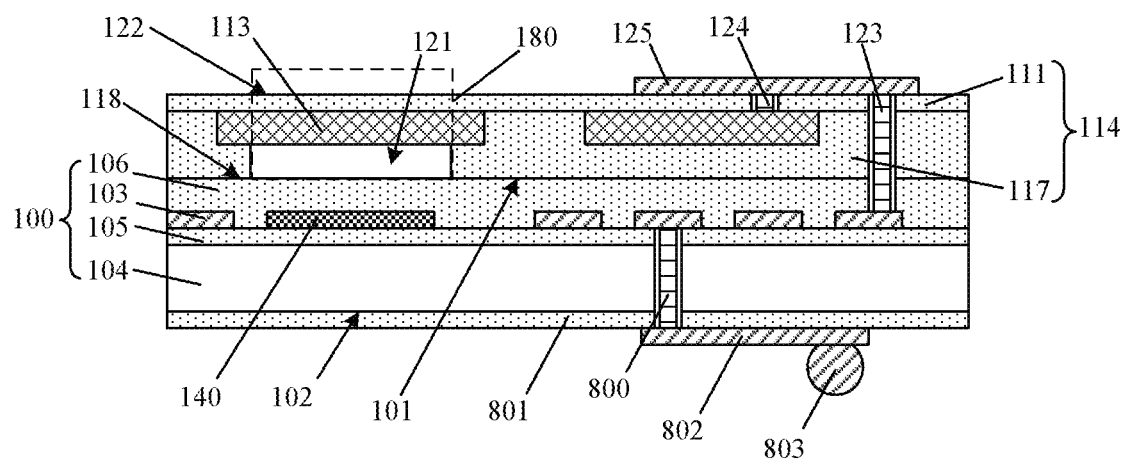
FIG. 27 is a schematic cross-sectional diagram of a MEMS pressure sensor in a fabrication process according to an embodiment of the present disclosure.

Based on FIG. 9, FIG. 27 is a schematic cross-sectional diagram of a MEMS pressure sensor in a fabrication process according to an embodiment of the present disclosure.

Referring to FIG. 27, a fourth conductive plug 800 passing through the first substrate 100 from the side of the second surface 102 of the first substrate 100 to the at least one conductive layer 103 is formed. The conductive layer 103 connected to the fourth conductive plug 800 and the conductive layer 103 connected to the first conductive plug 123 may be arranged in a same layer or different layers.

In the embodiment, the forming the fourth conductive plug 800 includes: forming a fourth dielectric layer 801 on the second surface of the first substrate 100, with a portion of the second surface 102 of the first substrate 100 being exposed from the fourth dielectric layer 801; etching the first substrate 100 with the fourth dielectric layer 801 being a mask until at least one conductive layer 103 is exposed, to form a fourth through hole in the first substrate 100; and forming a fourth conductive plug 800 in the fourth through hole.

In the embodiment, before the fourth dielectric layer 801 is formed, the first substrate 100 may be thinned from the second surface 102, thereby reducing an etching depth and the difficulty of an etching process for forming the fourth through hole.

In the embodiment, after the fourth conductive plug 800 is formed, the method further includes: forming a fourth conductive layer 802 on a surface of the fourth dielectric layer, with the fourth conductive layer 802 being located on a top surface of the fourth conductive plug 800. In addition, a solder ball 803 may be formed on a surface of the fourth conductive layer 802, and the formed MEMS pressure sensor may be electrically connected to wires on a printed circuit board via the solder ball 803.

The fourth dielectric layer 801 is used to electrically isolate the fourth conductive layer 802 from the first substrate 104. The fourth dielectric layer 801 may be comprised of silicon oxide, silicon nitride, silicon oxynitride, a low-k dielectric material or an ultra low-k dielectric material. The fourth conductive layer 802 may be comprised of a conductive material including a metal material, a metal compound material or a semiconductor material doped with ions. The fourth through hole may be formed by an anisotropic dry etching process. The first substrate 100 may be thinned from the second surface 102 by a chemical mechanical polishing process.

The forming the fourth conductive plug 800 includes: forming a conductive film partially on the second surface 102 and partially in the fourth through hole, with the fourth through hole being filled with the conductive film; and removing an unnecessary portion of the conductive film on the second surface 102 to form the fourth conductive plug 800. In an embodiment, the conductive film on the second surface 102 may be removed completely. In another embodiment, a portion of the conductive film may be reserved on the second surface 102.

An end of the fourth conductive plug 800 may protrude from, be recessed into or be flush with, the second surface 102.

In an embodiment, before the conductive film is formed, an insulating layer is formed on a surface of a sidewall of the fourth through hole, and then the conductive film filling up the fourth through hole is formed after the insulating layer is formed. The insulating layer is used to electrically isolate the conductive film from the first base 104.

The fourth conductive plug 800 may be comprised of copper, tungsten, aluminum, silver or gold. The conductive film may be formed by a physical vapor deposition process, a chemical vapor deposition process, an atomic layer deposition process, an electroplating process or a chemical plating process. The conductive film on the second surface 102 may be removed by a chemical mechanical polishing process. In addition, a first barrier layer may be formed on the surface of the wall side of the fourth through hole and the conductive film is formed on a surface of the first barrier layer. The first barrier layer may be comprised of one or more of titanium, tantalum, titanium nitride and titanium nitride.

In another embodiment, before the first substrate and the second substrate are bonded with each other, a fourth conductive plug is formed from the side of the first surface 101 of the first substrate 100, that is, the fourth conductive plug may pass through the first substrate 100, or may not pass through the first substrate 100. In a case that the fourth conductive plug does not pass through the first substrate 100, after the fourth conductive plug is formed, the first substrate 100 is thinned from the second surface 102 until the fourth conductive plug is exposed. In the embodiment, the formed fourth conductive plug passes from the second surface 102 of the first substrate 100 to the at least one conductive layer 103 on the side of the first surface 101. The forming the fourth conductive plug 800 includes: forming a fourth through hole on the side of the first surface 101 of the first substrate 100, with the bottom of the fourth through hole protrudes into the first base 104; forming a conductive film partially on the first surface 101 and partially in the fourth through hole, with the fourth through hole being filled with the conductive film; and removing an unnecessary portion of the conductive film on the first surface 101 to form the fourth conductive plug. In an embodiment, an insulating layer is formed on the surface of a sidewall of the fourth through hole before the conductive film is formed before the conductive film is formed, and then the conductive film filling up the fourth through hole is formed after the insulating layer is formed. The insulating layer is used to electrically isolate the conductive film from and the first base 104.

Although the present disclosure is disclosed above, it is not intended to limit the present disclosure. Various changes and modifications may be made by those skilled in the art without departing from the spirit and scope of the present disclosure. Therefore, the scope of the present disclosure should be defined by the appended claims.

The invention claimed is:

1. A method for forming a Micro-Electro Mechanical System (MEMS) pressure sensor, comprising:
   preparing a first substrate, wherein the first substrate comprises a first surface and a second surface opposite to the first surface, and the first substrate comprises at least one conductive layer arranged on the side of the first surface of the first substrate;
   preparing a second substrate, wherein the second substrate comprises a third surface and a fourth surface opposite to the third surface, the second substrate comprises a second base and a pressure-sensing electrode arranged on or above or in the second base, the second substrate comprises a pressure sensing region in which the pressure-sensing electrode is arranged, and the pressure-sensing electrode is arranged on the side of the third surface of the second substrate;
   bonding the first surface of the first substrate and the third surface of the second substrate with each other and form a substrate bonding interface;
   forming a cavity between the first substrate and the pressure sensing region of the second substrate;
   thinning the second substrate from the fourth surface of the second substrate by partially removing the second base, to form a fifth surface opposite to the third surface of the second substrate; and
   forming a first conductive plug passing through the second substrate from the side of the fifth surface of the second substrate to the at least one conductive layer, wherein the first conductive plug is used to electrically connect the conductive layer to the pressure-sensing electrode.

2. The method for forming the MEMS pressure sensor according to claim 1, wherein the second substrate further comprises a fixed electrode corresponding to the pressure-sensing electrode and the cavity is formed between the pressure-sensing electrode and the fixed electrode.

3. The method for forming the MEMS pressure sensor according to claim 1, wherein the first substrate further comprises a fixed electrode arranged on the side of the first surface of the first substrate; when the first surface of the first substrate and the third surface of the second substrate are bonded with each other, the fixed electrode corresponds to the pressure-sensing electrode and the cavity is formed between the pressure-sensing electrode and the fixed electrode.

4. The method for forming the MEMS pressure sensor according to claim 3, wherein the forming the cavity comprises: before the first surface of the first substrate and the third surface of the second substrate are bonded with each other, forming a first opening on the side of the third surface of the second substrate or on the side of the first surface of the first substrate, or, forming the first opening on both the side of the first surface of the first substrate and the side of the third surface of the second substrate, with a location of the first opening corresponding to a location of the pressure sensing region.

5. The method for forming the MEMS pressure sensor according to claim 1, wherein the first substrate further comprises a circuit.

6. The method for forming the MEMS pressure sensor according to claim 1, wherein a third opening is formed in the second substrate after the second substrate is thinned from the fourth surface, with a location of the third opening corresponding to a location of the pressure sensing region.

7. The method for forming the MEMS pressure sensor according to claim 1, wherein the preparing the second substrate comprises: preparing a semiconductor-on-insulator substrate, wherein the semiconductor-on-insulator substrate comprises a base, an insulating layer arranged on a surface of the base and a semiconductor layer arranged on a surface of the insulating layer; and forming a pressure-sensing electrode in the semiconductor layer, with the base being the second base.

8. The method for forming the MEMS pressure sensor according to claim 1, wherein the second substrate further comprises a second bonding layer arranged on the side of the third surface; or, the first substrate comprises a first bonding layer arranged on the side of the first surface; or, the second substrate further comprises a second bonding layer arranged on the side of the third surface and the first substrate comprises a first bonding layer arranged on the side of the first surface.

9. The method for forming the MEMS pressure sensor according to claim 1, wherein the first surface of the first substrate and the third surface of the second substrate are bonded with each other by a direct-bonding process.

10. The method for forming the MEMS pressure sensor according to claim 1, wherein the second substrate further comprises a reference unit region, a cavity is formed between the first substrate and the reference unit region of the second substrate when the first surface of the first substrate and the third surface of the second substrate are bonded with each other, and a deformation on a portion of the second substrate corresponding to the reference unit region is less than a deformation on a portion of the second substrate corresponding to the pressure sensing region under a same external pressure.

11. The method for forming the MEMS pressure sensor according to claim 1, further comprising: forming a second opening passing through the first substrate, wherein a location of the second opening corresponds to a location of the pressure sensing region of the second substrate after the first surface of the first substrate and the third surface of the second substrate are bonded with each other.

12. The method for forming the MEMS pressure sensor according to claim 1, further comprising: forming one or more fifth through hole passing through the second base, on the side of the fifth surface of the second substrate, with a location of the fifth through hole corresponding to a location of the pressure sensing region.

13. A Micro-Electro Mechanical System (MEMS) pressure sensor, comprising:
a first substrate, wherein the first substrate comprises a first surface and a second surface opposite to the first surface, and the first substrate comprises at least one conductive layer arranged on the side of the first surface of the first substrate;
a second substrate, wherein the second substrate comprises a third surface and a fifth surface opposite to the third surface, the second substrate comprises a second base and a pressure-sensing electrode arranged on or above or in the second base, and the second substrate comprises a pressure sensing region in which the pressure-sensing electrode is arranged, and the pressure-sensing electrode is arranged on a side of the third surface of the second substrate;
a substrate bonding interface formed by bonding the first surface of the first substrate and the third surface of the second substrate;
a cavity formed between the first substrate and the pressure sensing region of the second substrate; and
a first conductive plug passing through the second substrate from the side of the fifth surface of the second substrate to the at least one conductive layer, wherein the first conductive plug is used to electrically connect the conductive layer to the pressure-sensing electrode.

14. The MEMS pressure sensor according to claim 13, wherein the second substrate further comprises a fixed electrode corresponding to the pressure-sensing electrode and the cavity is formed between the pressure-sensing electrode and the fixed electrode, or
the first substrate further comprises a fixed electrode arranged on the side of the first surface of the first substrate; the fixed electrode corresponds to the pressure-sensing electrode and the cavity is formed between the pressure-sensing electrode and the fixed electrode.

15. The MEMS pressure sensor according to claim 13, wherein the first substrate further comprises a circuit.

16. The MEMS pressure sensor according to claim 13, wherein the second substrate further comprises a second bonding layer arranged on the side of the third surface; or, the first substrate comprises a first bonding layer arranged on the side of the first surface; or, the second substrate further comprises a second bonding layer arranged on the side of the third surface and the first substrate comprises a first bonding layer arranged on the side of the first surface.

17. The MEMS pressure sensor according to claim 13, wherein the second substrate further comprises a reference unit region, a cavity is formed between the first substrate and the reference unit region of the second substrate, and a deformation on a portion of the second substrate corresponding to the reference unit region is less than a deformation on a portion of the second substrate corresponding to the pressure sensing region.

18. The MEMS pressure sensor according to claim 13, wherein a second opening passing through the first substrate is formed, with a location of the second opening corresponding to a location of the pressure sensing region of the second substrate.

19. The MEMS pressure sensor according to claim 13, further comprising: one or more fifth through hole arranged on the side of the fifth surface of the second substrate and passing through the second base, with a location of the fifth through hole corresponding to a location of the pressure sensing region.

20. The MEMS pressure sensor according to claim 13, further comprising a third opening formed in the second substrate, with a location of the third opening corresponding to a location of the pressure sensing region.

* * * * *